US009100446B2

(12) United States Patent
Cohn et al.

(10) Patent No.: US 9,100,446 B2
(45) Date of Patent: *Aug. 4, 2015

(54) METHOD, SYSTEM AND APPARATUS FOR ACTIVATION OF A HOME SECURITY, MONITORING AND AUTOMATION CONTROLLER USING REMOTELY STORED CONFIGURATION DATA

(75) Inventors: Alan Wade Cohn, Austin, TX (US); Gary Robert Faulkner, Austin, TX (US); James Edward Kitchen, Austin, TX (US); David Leon Proft, Austin, TX (US); Corey Wayne Quain, Lago Vista, TX (US)

(73) Assignee: iControl Networks, Inc., Redwood City, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 12/770,365

(22) Filed: Apr. 29, 2010

(65) Prior Publication Data

US 2010/0280635 A1 Nov. 4, 2010

Related U.S. Application Data

(60) Provisional application No. 61/174,366, filed on Apr. 30, 2009.

(51) Int. Cl.
*H04L 29/08* (2006.01)
*G08B 25/00* (2006.01)
(Continued)

(52) U.S. Cl.
CPC ............ *H04L 69/26* (2013.01); *G06F 11/0757* (2013.01); *G08B 13/00* (2013.01); *G08B 25/001* (2013.01); *G08B 25/004* (2013.01); *G08B 25/008* (2013.01); *G08B 25/14* (2013.01); *G08B 29/08* (2013.01); *H04L 12/2809* (2013.01);
(Continued)

(58) Field of Classification Search
None
See application file for complete search history.

(56) References Cited

U.S. PATENT DOCUMENTS 6,211,783 B1 * 4/2001 Wang ............................ 340/506
6,295,346 B1 * 9/2001 Markowitz et al. ...... 379/127.01
(Continued)

FOREIGN PATENT DOCUMENTS

FR 2 584 217 1/1987
WO WO 99/34339 7/1999
(Continued)

OTHER PUBLICATIONS

"Control Panel Standard—Features for False Alarm Reduction," The Security Industry Association, © SIA 2009, pp. 1-48.

*Primary Examiner* — Ninos Donabed
(74) *Attorney, Agent, or Firm* — IPR Law Group, PC

(57) ABSTRACT

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for a software-based installation workflow to activate and provision the controller and associated sensors and network. Embodiments of the present invention also provide for downloading of previously-stored configuration data to the controller from a remote server, and for activation and provisioning of the controller from the previously-stored configuration data.

14 Claims, 24 Drawing Sheets

(51) Int. Cl.
*H04L 29/06* (2006.01)
*H04L 12/28* (2006.01)
*G08B 25/14* (2006.01)
*G08B 29/08* (2006.01)
*G08B 13/00* (2006.01)
*G06F 11/07* (2006.01)

(52) U.S. Cl.
CPC ........ *H04L 12/2816* (2013.01); *H04L 12/2818* (2013.01); *H04L 12/2825* (2013.01); *H04L 12/2834* (2013.01); *H04L 67/125* (2013.01)

(56) References Cited

U.S. PATENT DOCUMENTS

| | | | | |
|---|---|---|---|---|
| 6,369,705 | B1* | 4/2002 | Kennedy | 340/506 |
| 6,756,896 | B2* | 6/2004 | Ford | 340/506 |
| 6,873,256 | B2* | 3/2005 | Lemelson et al. | 340/539.1 |
| 7,081,813 | B2* | 7/2006 | Winick et al. | 340/521 |
| 7,113,090 | B1* | 9/2006 | Saylor et al. | 340/539.18 |
| 7,262,690 | B2* | 8/2007 | Heaton et al. | 340/500 |
| 7,437,753 | B2* | 10/2008 | Nahum | 726/4 |
| 7,469,139 | B2* | 12/2008 | van de Groenendaal | 455/411 |
| 7,568,018 | B1* | 7/2009 | Hove et al. | 709/221 |
| 7,571,459 | B2* | 8/2009 | Ganesh et al. | 726/1 |
| 7,751,409 | B1* | 7/2010 | Carolan | 370/395.53 |
| 7,787,863 | B2* | 8/2010 | van de Groenendaal | 455/411 |
| 7,890,612 | B2* | 2/2011 | Todd et al. | 709/220 |
| 7,921,686 | B2* | 4/2011 | Bagepalli et al. | 70/223 |
| 8,200,827 | B1* | 6/2012 | Hunyady et al. | 709/227 |
| 8,239,477 | B2* | 8/2012 | Sharma et al. | 709/212 |
| 2002/0116117 | A1* | 8/2002 | Martens et al. | 701/115 |
| 2003/0062997 | A1 | 4/2003 | Naidoo et al. | 340/531 |
| 2003/0158635 | A1* | 8/2003 | Pillar et al. | 701/1 |
| 2004/0117462 | A1 | 6/2004 | Bodin et al. | 709/220 |
| 2004/0117465 | A1* | 6/2004 | Bodin et al. | 709/222 |
| 2005/0149746 | A1* | 7/2005 | Lu et al. | 713/191 |
| 2005/0216580 | A1 | 9/2005 | Raji et al. | 709/223 |
| 2005/0276389 | A1* | 12/2005 | Hinkson et al. | 379/37 |
| 2006/0051122 | A1 | 3/2006 | Kawazu et al. | 399/88 |
| 2006/0067484 | A1 | 3/2006 | Elliot et al. | 379/37 |
| 2006/0078344 | A1 | 4/2006 | Kawazu et al. | 399/69 |
| 2006/0129837 | A1* | 6/2006 | Im et al. | 713/184 |
| 2006/0209857 | A1* | 9/2006 | Hicks, III | 370/401 |
| 2009/0066789 | A1 | 3/2009 | Baum et al. | 348/143 |
| 2009/0070436 | A1 | 3/2009 | Dawes et al. | 709/219 |
| 2009/0070477 | A1 | 3/2009 | Baum et al. | 709/231 |
| 2009/0070681 | A1 | 3/2009 | Dawes et al. | 715/736 |
| 2009/0070682 | A1 | 3/2009 | Dawes et al. | 715/736 |
| 2009/0070692 | A1 | 3/2009 | Dawes et al. | 715/764 |
| 2009/0074184 | A1 | 3/2009 | Baum et al. | 380/205 |
| 2009/0077167 | A1 | 3/2009 | Baum et al. | 709/203 |
| 2009/0077622 | A1 | 3/2009 | Baum et al. | 726/1 |
| 2009/0077623 | A1 | 3/2009 | Baum et al. | 726/1 |
| 2009/0077624 | A1 | 3/2009 | Baum et al. | 726/1 |
| 2009/0134998 | A1 | 5/2009 | Baum et al. | 340/539.1 |
| 2009/0138600 | A1 | 5/2009 | Baum et al. | 709/226 |
| 2009/0138958 | A1 | 5/2009 | Baum et al. | 726/12 |
| 2009/0165114 | A1* | 6/2009 | Baum et al. | 726/12 |

FOREIGN PATENT DOCUMENTS

| | | |
|---|---|---|
| WO | WO 2004/098127 | 11/2004 |
| WO | WO 2005/091218 | 9/2005 |
| WO | WO 2009/006670 | 1/2009 |

* cited by examiner

METHOD, SYSTEM AND APPARATUS FOR ACTIVATION OF A HOME SECURITY, MONITORING AND AUTOMATION CONTROLLER USING REMOTELY STORED CONFIGURATION DATA

CROSS REFERENCE TO RELATED APPLICATIONS

This invention claims priority from Provisional Patent Application Ser. No. 61/174,366, entitled "REMOTE SECURITY STATION," filed Apr. 30, 2009, and naming Alan Wade Cohn as inventor. This provisional patent application is incorporated herein by reference in its entirety and for all purposes.

FIELD OF THE INVENTION

Embodiments of the present invention relate generally to the field of home security, monitoring and automation, and specifically to activation and provisioning of a user-configurable controller for security, monitoring and automation using remotely-stored configuration data.

BACKGROUND OF THE INVENTION

Residential electronics and control standards provide an opportunity for a variety of options for securing, monitoring, and automating residences. Wireless protocols for transmission of security information permit placement of a multitude of security sensors throughout a residence without a need for running wires back to a central control panel. Inexpensive wireless cameras also allow for placement of cameras throughout a residence to enable easy monitoring of the residence. A variety of home automation control protocols have also been developed to allow for centralized remote control of lights, appliances, and environmental apparatuses (e.g., thermostats). Traditionally, each of these security, monitoring and automation protocols require separate programming, control and monitoring stations. To the extent that home automation and monitoring systems have been coupled to home security systems, such coupling has involved including the automation and monitoring systems as slaves to the existing home security system. This limits the flexibility and versatility of the automation and monitoring systems and ties such systems to proprietary architectures.

A security system alerts occupants of a dwelling and emergency authorities of a violation of premises secured by the system. A typical security system includes a controller connected by wireless or wired connections to sensors deployed at various locations throughout the secured dwelling. In a home, sensors are usually deployed in doorways, windows, and other points of entry. Motion sensors can also be placed strategically within the home to detect unauthorized movement, while smoke and heat sensors can detect the presence of fire.

A home monitoring system provides an ability to monitor a status of a home so that a user can be made aware of any monitored state changes. For example, when a sensor is tripped, real-time alerts and associated data such as video or photo clips can be sent to the user (e.g., to a network-connected computer or to a mobile device).

A home automation system enables automation and remote control of lifestyle conveniences such as lighting, heating, cooling, and appliances. Typically these various lifestyle conveniences are coupled to a controller via wireless or wired communications protocols. A central device is then used to program the various lifestyle conveniences.

Rather than having multiple devices to control each of the security, monitoring and automation environments, it is desirable to have a centralized controller capable of operating in each environment, thereby reducing the equipment needed in a dwelling. It is further desirable for such a controller to function as a gateway for external network access so that a user can control or monitor devices in locations remote from the dwelling.

Traditional home security and monitoring systems require specialized technicians and equipment to install the system and sensors. These traditional systems can take many hours to install. It is thus desirable for the security monitoring and automation controller of the present invention to incorporate an activation and provisioning workflow that allows for end-users or installers with minimal training to install the controller and associated sensors. It is further desirable for a security, monitoring and automation controller to incorporate activation and provisioning workflow that facilitates downloading of previously-stored configuration information of a previous controller or controller configuration to the controller, in order to avoid a process of reconfiguring the controller from scratch.

SUMMARY OF THE INVENTION

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for a software-based installation workflow to activate and provision the controller and associated sensors and network. Embodiments of the present invention also provide for downloading of previously stored configuration data to the controller from a remote server.

One embodiment of the present invention provides for configuring a first security, monitoring and automation (SMA) controller by transmitting a unique identifier to a first remote computer over a network connection, wherein the unique identifier is associated with configuration data previously stored by a second remote computer, and the configuration data is compatible with the first SMA controller, receiving the configuration data, storing the configuration data in a memory of the first SMA controller, and configuring the first SMA controller with the stored configuration data.

In one aspect of this embodiment, the configuration data was provided to the second remote computer by a second SMA controller. In a further aspect, the configuration data was provided by the second SMA controller immediately subsequent to an initial configuration of the second SMA controller. In another further aspect, the configuration data was provided by the second SMA controller immediately subsequent to a modification of configuration data of the second SMA controller.

In another aspect of the above embodiment, the configuration data comprises one or more of configuration data for a home domain network, configuration data for a cellular network connection, configuration data for one or more security sensors and security zones, configuration data for one or more monitoring devices, configuration data for one or more home area network devices having an automation interface, configuration data for modular devices coupled to the first SMA controller, and widget programs and associated configuration data for those widget programs.

In another aspect of the above embodiment, the first SMA controller requests the unique identifier using a display device coupled to the first SMA controller. In another aspect of the above embodiment, the first SMA controller tests a communication path to a third remote computer subsequent to configuring the first SMA controller using the stored configuration data.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
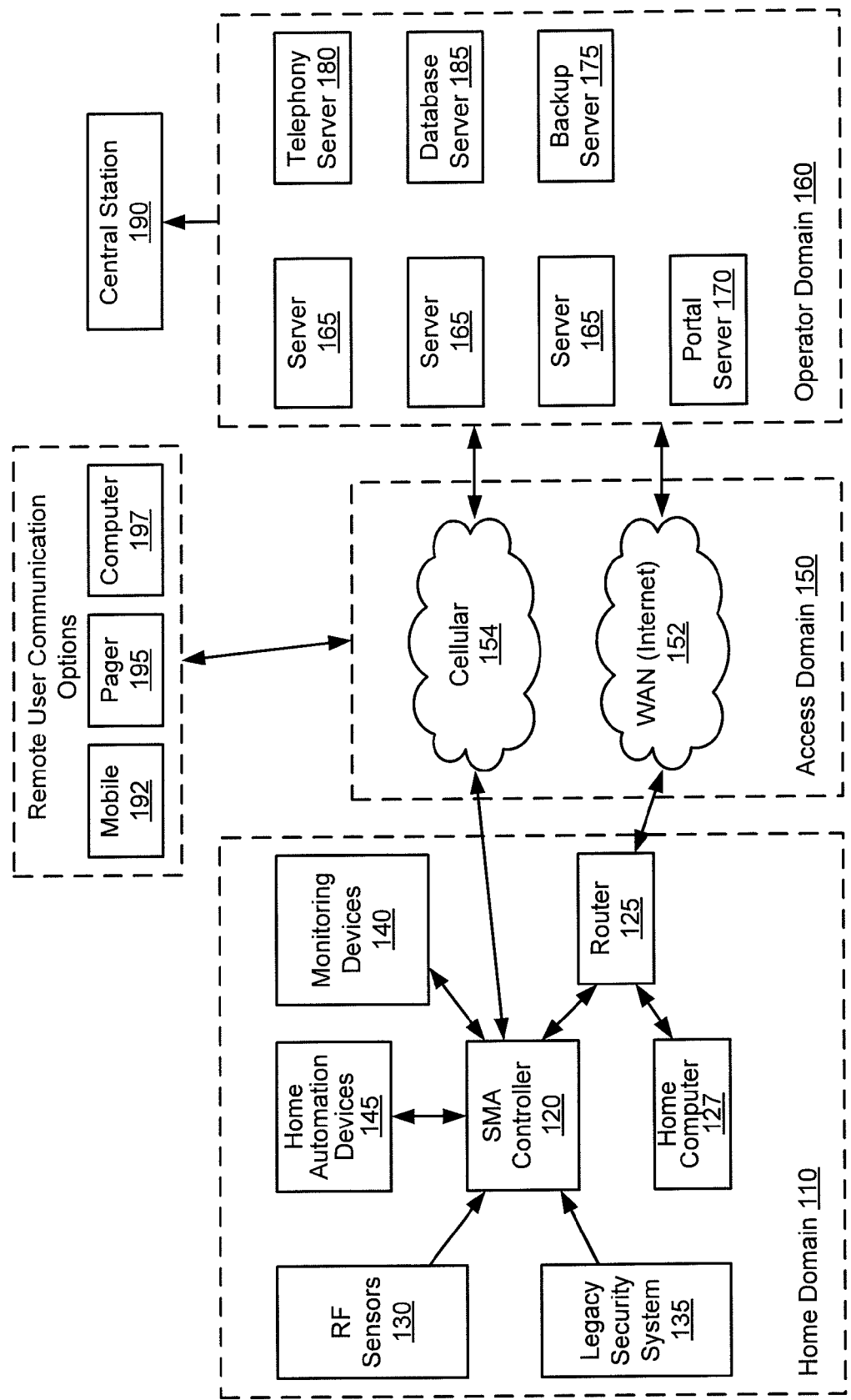
FIG. 1 is a simplified block diagram illustrating an architecture including a set of logical domains and functional entities within which embodiments of the present invention interact.

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for a software-based installation workflow to activate and provision the controller and associated sensors and network. In embodiments of the present invention, this workflow includes activation and provisioning through use of configuration data stored by a remote server and downloaded to the controller.

A typical security system installation requires several hours of a trained technician performing on-site procedures. One reason for this is that a typical security system uses a key pad that has a limited feedback capability and then only provides feedback in codes that require a manual to interpret. Further, a typical install requires keypad entry of hundreds of field codes to configure sensors and the central control unit to interpret signals from those sensors. For example, an installation technician must provide information for each sensor as to the type of sensor and the sensor's purpose. Many months of training are required in order to certify a technician to perform such installs. Providing such training requires a significant investment in capital by a security system provider. In addition, the on-site necessity of entry and interpretation of the many installation codes requires a significant amount of on-site time by those technicians. This is an additional investment in resources by the provider.

Embodiments of the present invention address the resource intensive issues presented by installation of traditional systems. The automated installation workflow provided by embodiments of the present invention enables a minimally-trained technician or even an end user to perform an installation of the security, monitoring and automation system. A touch screen display provides detailed information about each step of the installation workflow, and feedback about the results of each step. Embodiments of the present invention thus enable an installation to be performed with significantly reduced on-site presence of a technician, thereby conserving both monetary and human resources of a provider of security, monitoring and automation system services.

In addition, if a typical security system suffers from a failure such that the controller of the system must be replaced, then an installer of the replacement system will need to repeat the entire installation process of providing keypad sequences and recoding all zone and sensor identification information. Embodiments of the present invention provide for remotely storing configuration data and using that remotely stored configuration data to configure a replacement of the original controller. The stored configuration data can also be used in other scenarios, such as reconfiguration after a factory reset of a controller.

Architectural Overview

Embodiments of the configurable security, monitoring and automation (SMA) controller of the present invention provide not only for communicating with and interpreting signals from sensors and devices within a dwelling, but also for accessing and monitoring those sensors and devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled to the SMA controller in real-time, configure the controller, and provide controlling information to the SMA controller. The servers can further automatically provide information to a user via remote devices such as mobile phones, computers, and pagers. The servers further provide a connection to a traditional security central station, which can then contact authorities in the event of an alarm condition being detected by the SMA controller in the dwelling.

FIG. 1 is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station 190 and to various remote user communication options.

The home domain refers to a collection of security, monitoring and automation entities within a dwelling or other location having SMA devices. SMA controller 120 is a device that provides an end-user SMA interface to the various SMA entities (e.g., radio-frequency sensors) within home domain 110. SMA controller 120 further acts as a gateway interface between home domain 110 and operator domain 160. SMA gateway 120 provides such gateway access to operator domain 160 via a network router 125. Network router 125 can be coupled to SMA controller 120 and to home network devices such as home computer 127 via either hard wired or wireless connections (e.g., WiFi, tethered Ethernet, and power-line network). A network router 125 coupled to a broadband modem (e.g., a cable modem or DSL modem) serves as one link to networks in access domain 150.

SMA devices within home domain 110 can include a variety of RF or wireless sensors 130 whose signals are received and interpreted by SMA gateway 120. RF sensors 130 can include, for example, door or window sensors, motion detectors, smoke detectors, glass break detectors, inertial detectors, water detectors, carbon dioxide detectors, and key fob devices. SMA gateway 120 can be configured to react to a change in state of any of these detectors. In addition to acting and reacting to changes in state of RF sensors 130, SMA controller 120 also can be coupled to a legacy security system 135. SMA controller 120 controls the legacy security system by interpreting signals from sensors coupled to the legacy security system and reacting in a user-configured manner. SMA gateway 120, for example, will provide alarm or sensor state information from legacy security system 135 to servers in operator domain 160 that may ultimately inform central station 190 to take appropriate action.

SMA gateway 120 can also be coupled to one or more monitoring devices 140. Monitoring devices 140 can include, for example, still and video cameras that provide images that are viewable on a screen of SMA gateway 120 or a remotely connected device. Monitoring devices 140 can be coupled to SMA gateway 120 either wirelessly (e.g., WiFi via router 125) or other connections.

Home automation devices 145 (e.g., home area network devices having an automation interface) can also be coupled to and controlled by SMA gateway 120. SMA gateway 120 can be configured to interact with a variety of home automation protocols, such as, for example, Z-Wave and ZigBee.

Embodiments of SMA controller 120 can be configured to communicate with a variety of RF or wireless sensors and are not limited to the RF sensors, monitoring devices and home automation devices discussed above. A person of ordinary skill in the art will appreciate that embodiments of the present invention are not limited to or by the above-discussed devices and sensors, and can be applied to other areas and devices.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown). SMA controller 120 can include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA gateway 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user. Service tiers can relate to end user subscription levels offered by the operator (e.g., payment tiers corresponding to "gold" level service, "silver" level service and "bronze" level service). Finally the data access logic tier provides access to various sources of data including database servers.

FIG. 1 illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal can provide access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones). A management portal provides an operator representative access to support and manage SMA controllers in home domains 110 and corresponding user accounts via a web-based application. The management portal can provide tiers of management support so that levels of access to user information can be restricted based on authorization of a particular employee.

Telephony server 180 can process and send information related to alarm events received from SMA controllers 120 to alarm receivers at central monitoring station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller. Thus, alarms can be routed to different central stations based upon user accounts. Further, accounts can be transferred from one central station to another by modifying user account information. Telephony server 180 can communicate with alarm receivers at central station 190 using, for example, a security industry standard contact identification protocol (e.g., dual-tone multi-frequency [DTMF]) and broadband protocols.

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Selection of a type of database provided by database server 185 can be dependent upon a variety of criteria, including, for example, scalability and availability of data. One embodiment of the present invention uses database services provided by an ORACLE database. As will be discussed more fully below, the SMA controller configuration information stored by database server 185 can include all zone and sensor information, and configuration data related to monitoring devices, automation devices, routers and the like.

A server 165 in operator domain 160 provides a variety of functionality. Logically, a server 165 can be divided into the following functional modules: a broadband communication module, a cellular communication module, a notification module, a telephony communication module, and an integration module.

The broadband communication module manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, broadband heartbeat, and command of traffic between server 165 and SMA controller 120 over the broadband channel. Embodiments of the present invention provide for an always-on persistent TCP socket connection to be maintained between each SMA controller and server 165. A variety of protocols can be used for communications between server 165 and SMA controller 120 (e.g., XML over TCP, and the like). Such communication can be secured using standard transport layer security (TLS) technologies. Through the use of an always-on socket connection, servers 165 can provide near real-time communication between the server and an SMA controller 120. For example, if a user has a subscriber portal active and a zone is tripped within home domain 110, a zone fault will be reflected in near real-time on the subscriber portal user interface.

The cellular communication module manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel. When a cellular protocol communication stack is being used, a TCP socket connection can be established between the SMA controller and server to ensure reliable message delivery for critical messages (e.g., alarm events and commands). Once critical messages have been exchanged, the TCP connection can be shut down thereby reducing cellular communication costs. As with broadband communication, XMPP can be the messaging protocol used for such communications. Similarly, such communication can be secured using TLS and SASL authentication protocols. Non-critical messages between an SMA controller and a server can be sent using UDP. A compressed binary protocol can be used as a messaging protocol for such communications in order to minimize cellular costs for such message traffic. Such messages can be secured using an encryption algorithm, such as the tiny encryption algorithm (TEA). Cellular communication can be established over two network segments: the GSM service provider's network that provides a path between an SMA controller and a cellular access point, and a VPN tunnel between the access point and an operator domain data center.

A notification module of server 165 determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be past asynchronously to the notification module, which determines if, who and how to send those notifications based upon the user's configuration.

The telephony communication module provides communication between a server 165 and telephony server 180. When a server 165 receives and performs initial processing of alarm events, the telephony communication module forwards those events to a telephony server 180 which in turn communicates with a central station 190, as discussed above.

The integration module provides infrastructure and interfaces to integrate a server 165 with operator business systems, such as, for example, billing, provisioning, inventory, tech support, and the like. An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

SMA Controller Architecture

Figure 2:
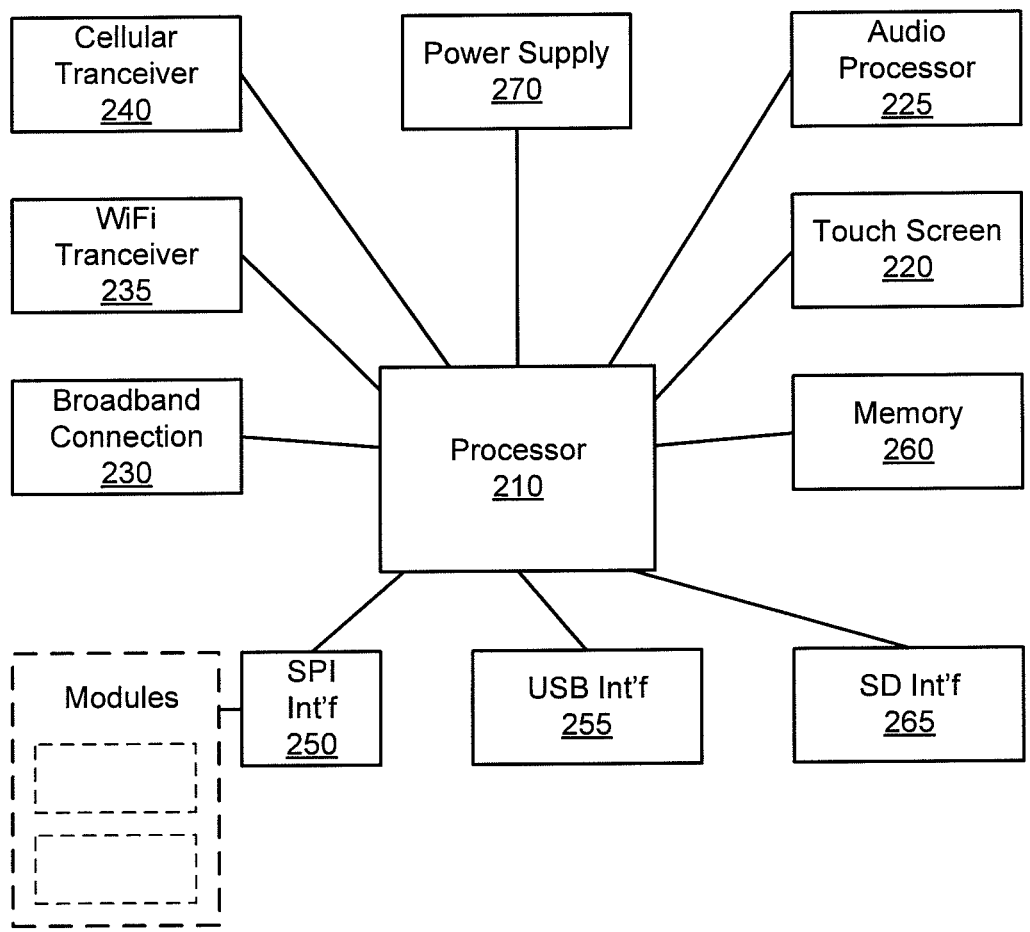
FIG. 2 is a simplified block diagram illustrating a hardware architecture of an SMA controller, according to one embodiment of the present invention.

FIG. 2 is a simplified block diagram illustrating a hardware architecture of an SMA controller, according to one embodiment of the present invention. A processor 210 is coupled to a plurality of communications transceivers, interface modules, memory modules, and user interface modules. Processor 210, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 220). Embodiments of the present invention can use a variety of processors, for example, an ARM core processor such as a FREESCALE i.MX35 multimedia applications processor.

SMA controller 120 can provide for user input and display via a touch screen 220 coupled to processor 210. Processor 210 can also provide audio feedback to a user via use of an audio processor 225. Audio processor 225 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 210 can provide broadband access to a router (e.g., router 125) via an Ethernet broadband connection PHY 130 or via a WiFi transceiver 235. The router can then be coupled to or be incorporated within an appropriate broadband modem. Cellular network connectivity can be provided by a cellular transceiver 240 that is coupled to processor 210. SMA controller 120 can be configured with a set of rules that govern when processor 210 will switch between a broadband connection and a cellular connection to operator domain 160.

In order to communicate with the various sensors and devices within home domain 110, processor 210 can be coupled to one or more transceiver modules via, for example, a serial peripheral interface such as a SPI bus 250. Such transceiver modules permit communication with sensors of a variety of protocols in a configurable manner. Embodiments of the present invention can use a transceiver to communicate with a variety of RF sensors 130 using a variety of communication protocols. Similarly, home automation transceivers (e.g., home area network devices having an automation interface) that communicate using, for example, Z-Wave or ZigBee protocols can be coupled to processor 210 via SPI 250. If SMA controller 120 is coupled to a legacy security system 135, then a module permitting coupling to the legacy security system can be coupled to processor 210 via SPI 250. Other protocols can be provided for via such plug-in modules including, for example, digital enhanced cordless telecommunication devices (DECT). In this manner, an SMA controller 120 can be configured to provide for control of a variety of devices and protocols known both today and in the future. In addition, processor 210 can be coupled to other types of devices (e.g., transceivers or computers) via a universal serial bus (USB) interface 255.

In order to locally store configuration information for SMA controller 120, a memory 260 is coupled to processor 210. Additional memory can be coupled to processor 210 via, for example, a secure digital interface 265. A power supply 270 is also coupled to processor 210 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 220) into all the SMA features. Via the various modules coupled to processor 210, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, and any real-time media such as video or audio.

Figure 3:
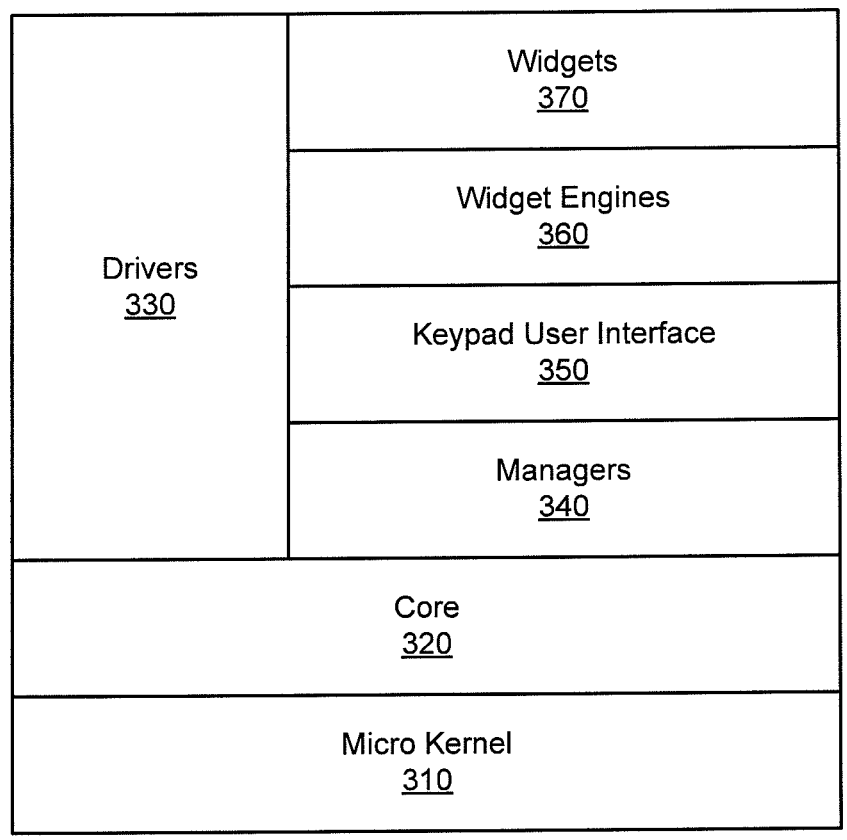
FIG. 3 is a simplified block diagram illustrating a logical stacking of an SMA controller's firmware architecture, usable with embodiments of the present invention.

FIG. 3 is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 310. An example of a micro-kernel operating system usable by embodiments of the present invention is a QNX real-time operating system. Under such a micro-kernel operating system, drivers, applications, protocol stacks and file systems run outside the operating system kernel in memory-protected user space. Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 320 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 330 interacts with hardware peripherals of SMA controller 120. For example, drivers can be provided for touch screen 220, broadband connection 230, WiFi transceiver 235, cellular transceiver 240, USB interface 255, SD interface 265, audio processor 225, and the various modules coupled to processor 210 via SPI interface 250. Manager layer 340 provides business and control logic used by the other layers. Managers can be provided for alarm activities, security protocols, keypad functionality, communications functionality, audio functionality, and the like.

Keypad user interface layer 350 drives the touch screen user interface of SMA controller 120. An example of the touch screen user interface consists of a header and a footer, widget icons and underlying widget user interfaces. Keypad user interface layer 350 drives these user interface elements by providing, for example, management of what the system Arm/Disarm interface button says and battery charge information, widget icon placement in the user face area between the header and footer, and interacting with widget engine layer 360 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as providing support for multi-media functionality through widgets that provide, for example, news, sports, weather and digital picture frame functionality. A main user interface screen can provide a set of icons, each of which represents a widget. Selection of a widget icon can then launch the widget. Widget engine layer 360 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 220. Information related to the various widgets is provided in widget layer 370.

Figure 4:
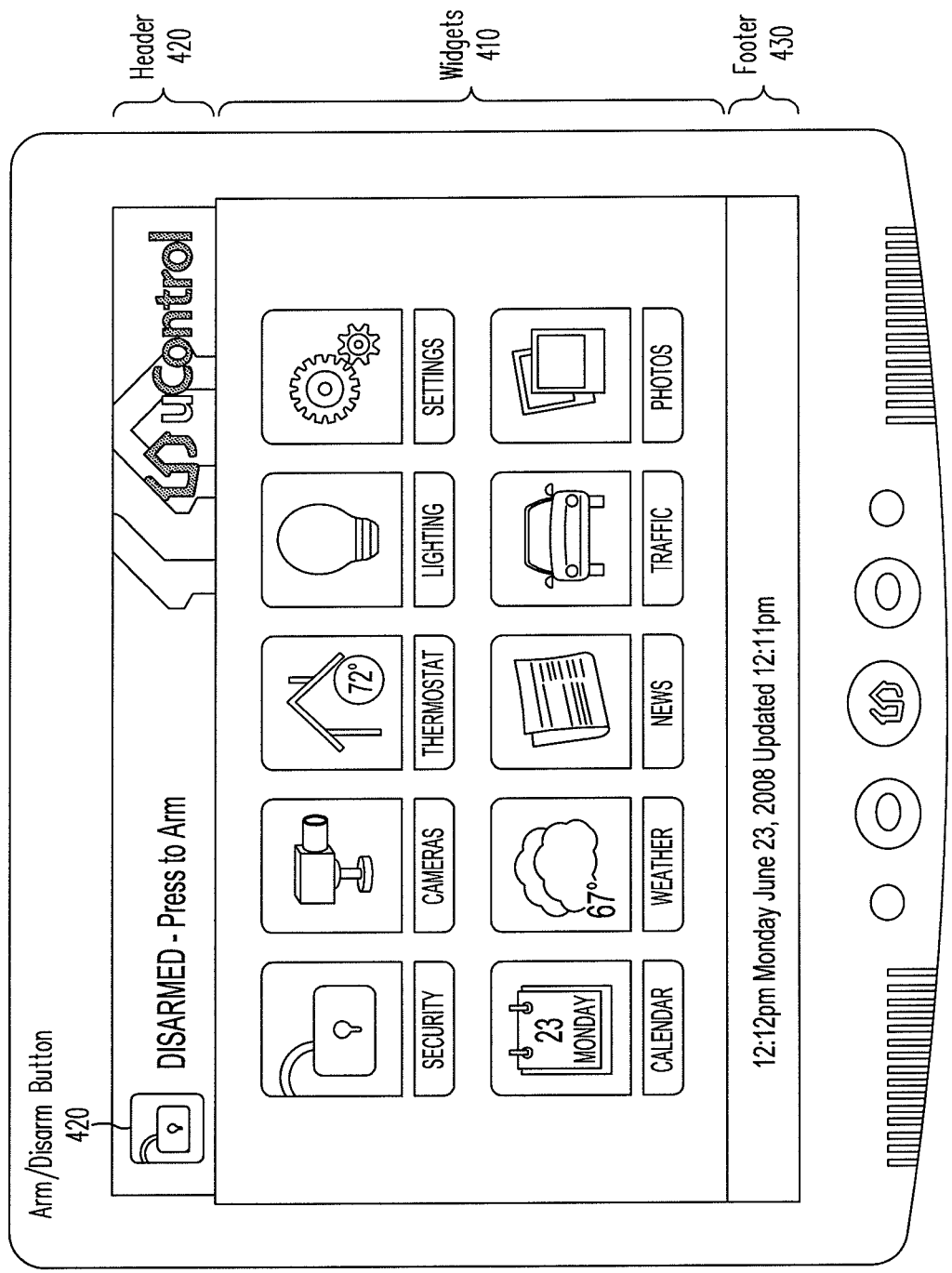
FIG. 4 is an illustration of an example user interface for an SMA controller 120, according to an embodiment of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

SMA Controller Configurability

In accord with embodiments of the present invention, SMA controller 120 can be configured by a user in order to provide desired functionality in home domain 110. In addition to the hardware configurable options discussed above (e.g., modules coupled to SPI interface 250), SMA controller 120 provides for additional configuration through the use of software and/or firmware. For example, SMA controller 120 can be configured to receive signals from a variety of security sensors (e.g., RF sensors 130) and to associate those sensors with the physical environment of home domain 110. In addition, SMA controller 120 can be configured to receive still and video information from one or more cameras, provide a variety of programs and utilities to a user, and is configurable to communicate with a variety of home automation devices.

Figure 5:
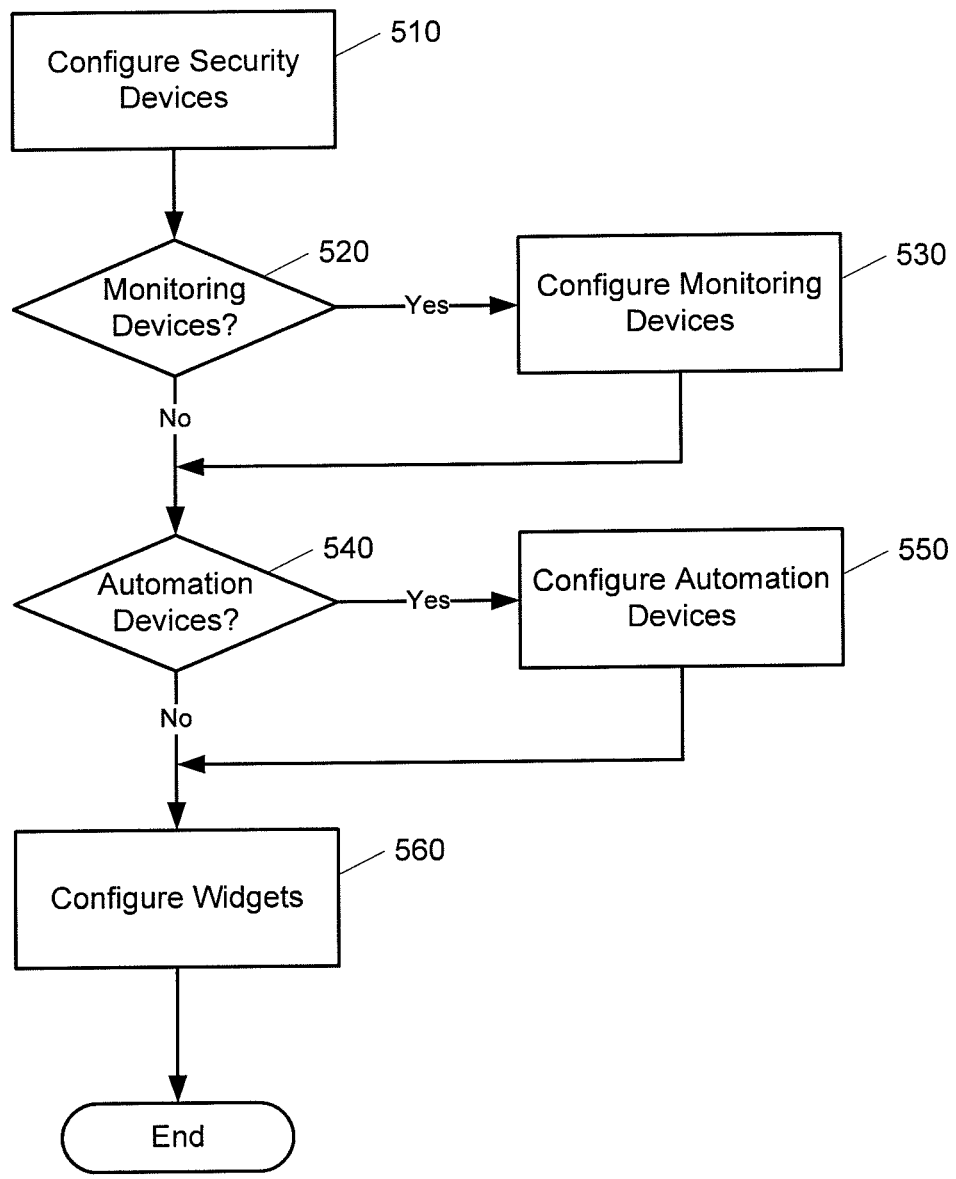
FIG. 5 is a simplified flow diagram illustrating steps performed in a configuration process of an SMA controller, in accord with embodiments of the present invention.

FIG. 5 is a simplified flow diagram illustrating one example of steps performed in a configuration process of an SMA controller, in accord with embodiments of the present invention. Embodiments of an SMA controller will typically be configured with security sensor information, either from RF sensors 130 or from a legacy security system 135. Therefore, an SMA controller will be configured to access and interpret information related to those security sensors (510).

A determination can then be made as to whether or not a user is including security cameras in home domain 110 (520). If cameras are included in the home domain, then a series of steps related to camera configuration is performed (530). Similarly, a determination can be made as to whether or not home automation devices are to be controlled by the SMA controller (540). If so, then a series of steps can be performed to configure the SMA controller to access those home automation devices (550).

A user can then perform steps necessary to configuring widgets accessible via the SMA controller (560). As discussed above, the user may access a portal server (e.g., 170) to select and configure those widgets that are desirable to be accessed at SMA controller 120. Once these configuration steps are performed, the SMA controller can be made available to perform tasks related to securing, monitoring, and providing automation control to home domain 110.

As each of these configuration steps are performed, the SMA controller can store the configuration data in a local memory (e.g., memory 260) and transmit the configuration data to an operator domain server 165 for storage (e.g., in database server 185). Alternatively, transmission of the configuration data can occur after all configuration steps in FIG. 5 have been completed. Configuration data can be transmitted either via broadband or cellular connection to the operator domain.

SMA controller 120 can be configured to receive and interpret signals from a variety of security sensors. Such sensors can include, for example, door/window sensors that can detect opening and closing of a door or window, motion detectors that can detect movement in an area of interest, smoke detectors, glass break detectors, inertia detectors, and key fobs. In order to usefully interpret signals from such detectors, embodiments of SMA controller 120 can search for signals from such sensors and be configured with information related to the location and tasks of those sensors.

SMA Controller Activation and Provisioning

As discussed above, embodiments of SMA controller 120 can be configured to monitor and control a variety of security sensors, cameras and automation devices. Embodiments of SMA controller 120 can be further configured to provide an end-user and installer intuitive guided activation and provisioning mechanism for installation of the SMA controller. Through the use of such a guided activation and provisioning mechanism, embodiments of the SMA controller will not require specialized technicians to perform such an installation. Instead, embodiments of the SMA controller are provided with an extensible software-based (e.g., firmware) architecture for an activation workflow that guides the end-user or installer through each step of the activation process and which performs various network and sensor configuration tasks unseen to the person conducting the activation process and without need for user interaction.

Figure 6:
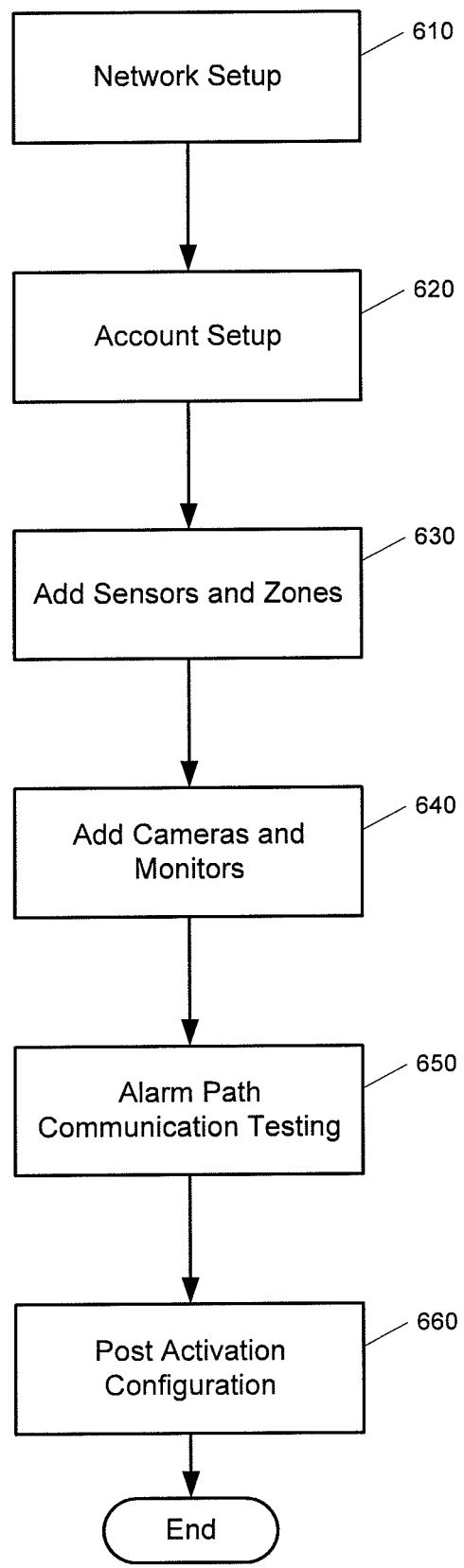
FIG. 6 is a simplified flow diagram illustrating an example of a general workflow for activation and provisioning of an SMA controller, in accord with embodiments of the present invention.

FIG. 6 is a simplified flow diagram illustrating one example of a general workflow for activation and provisioning of an SMA controller 120. The general workflow diagram includes high-level setup tasks that will be described in greater detail below. A network setup 610 can be performed in which the SMA controller 120 is used to configure a home domain router (e.g., router 125) and to create and secure a private WiFi network usable by the SMA controller and other devices that communicate with the SMA controller. Network setup tasks can also include, for example, connectivity testing from home domain 110 to servers in operator domain 160 and firmware updates. An account setup process 620 can be performed using an interface coupled to SMA controller 120 by which a person conducting the activation can provide subscriber information to servers in the operator domain. Security sensors and associated zones can be configured (630) and monitoring cameras can be coupled to the SMA controller's network (640). The general activation workflow can also include tasks related to alarm path communication testing 650, in which a determination can be made that alarm information is being properly received by central station 190. Finally, a variety of post-activation configuration tasks can be performed (660), including, for example, providing a variety of security codes and delay times, and transmitting configuration data of the SMA controller to a server in operator domain 160.

The workflow illustrated in FIG. 6 is intended as one example of a variety of high level tasks that can be performed using an SMA controller 120 in performing the activation process. The variety of steps involved in activation can be subdivided and supplemented in a number of ways and activation workflows of embodiments of the present invention should not be considered as limited to those steps illustrated in FIG. 6. Further, beyond steps requiring a prior configuration of a network for communication, the ordering of the steps illustrated in FIG. 6 is meant as an example and not a requirement. Further, in some configurations, the SMA controller may be configured to provide one or more of security, monitoring and automation control, and not necessarily all three. Thus, steps related to the configuration of any of these that are not needed for a particular home domain may be avoided.

Figure 7:
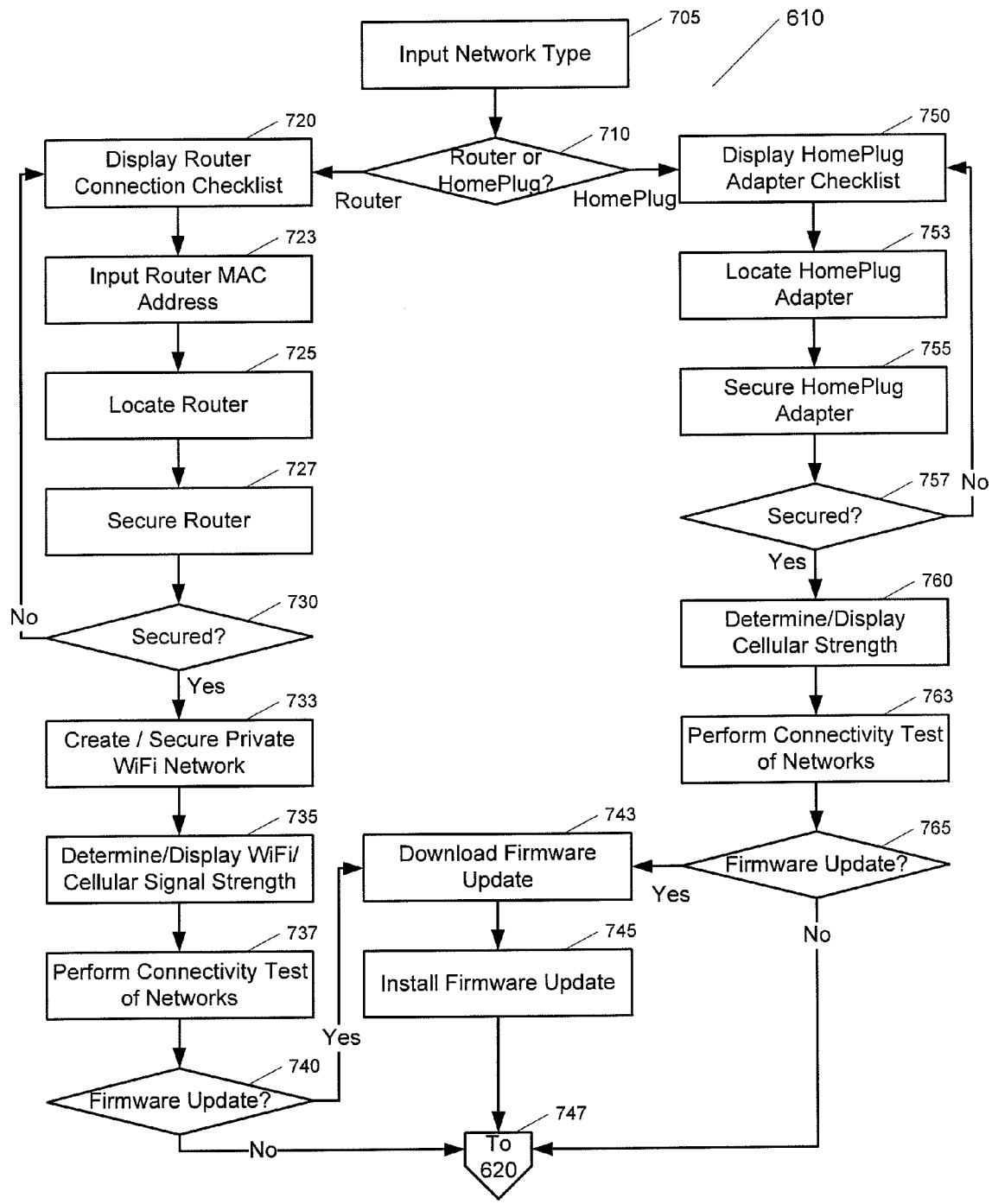
FIG. 7 is a simplified flow diagram illustrating one embodiment of a process flow for network setup usable in embodiments of the present invention.

FIG. 7 is a simplified flow diagram illustrating one embodiment of a process flow for network setup 610. Through the use of such a network setup process flow, embodiments of SMA controller 120 can perform tasks related to securing a router 125 in home domain 110 in order that home security and monitoring communications can be performed using a secured network. Since embodiments of SMA controller 120 envision the use of a variety of home domain networking options, an opportunity is provided for the person performing the installation to input an appropriate network type through which the SMA controller communicates in the home domain being configured (705). The opportunity to provide this information can be given through the use of a display and touch screen coupled to SMA controller 120. FIG. 7 illustrates workflows related to two different home networking options (e.g., a wireless router or a power-line network adapter (e.g., HomePlug)), but embodiments of SMA controller 120 are not limited to the use of these networking options. Different workflows can be provided for additional networking options as those become available or desired by an SMA provider, and embodiments of SMA controller 120 are not limited to those illustrated in FIG. 7. For example, an SMA controller 120 can be coupled to a router 125 via tethered Ethernet (e.g., a twisted pair connection), which would not necessarily require configuration of a secured wireless or power-line network. Thus, a different workflow can be provided for such a connection.

Figure 13A:
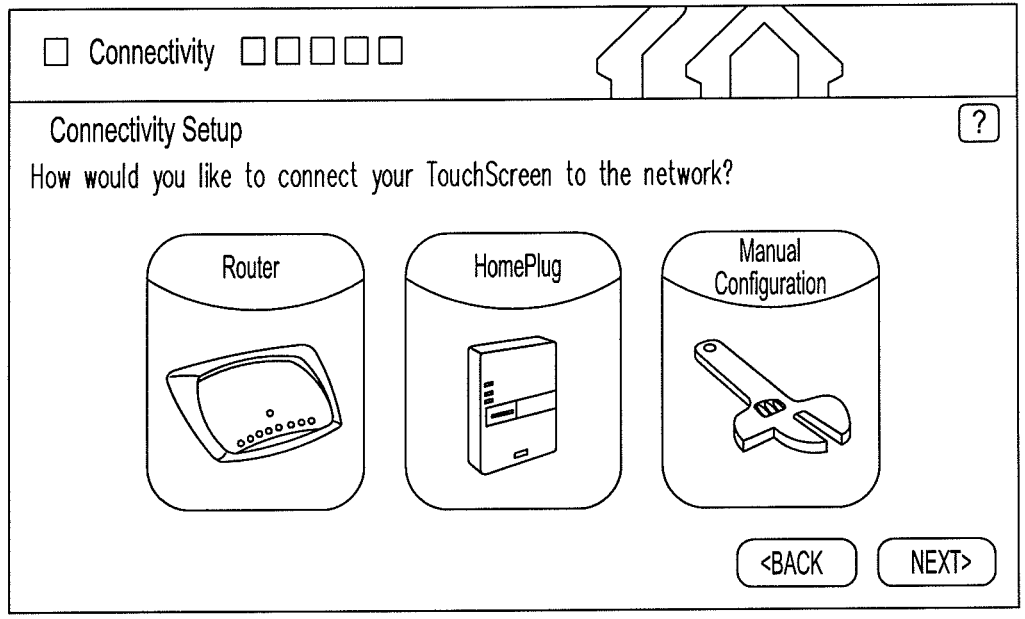
FIGS. 13A-R illustrate examples of displays provided by an SMA controller in accord with embodiments of the present invention.

FIG. 13A illustrates an example of a display providing networking options for a user of SMA controller 120. A user can select one of the options through the use of the touch screen. A determination can then be made as to which type of networking option was selected by the person performing the install (710). That selection determines the appropriate workflow for configuring the network.

Figure 13B:
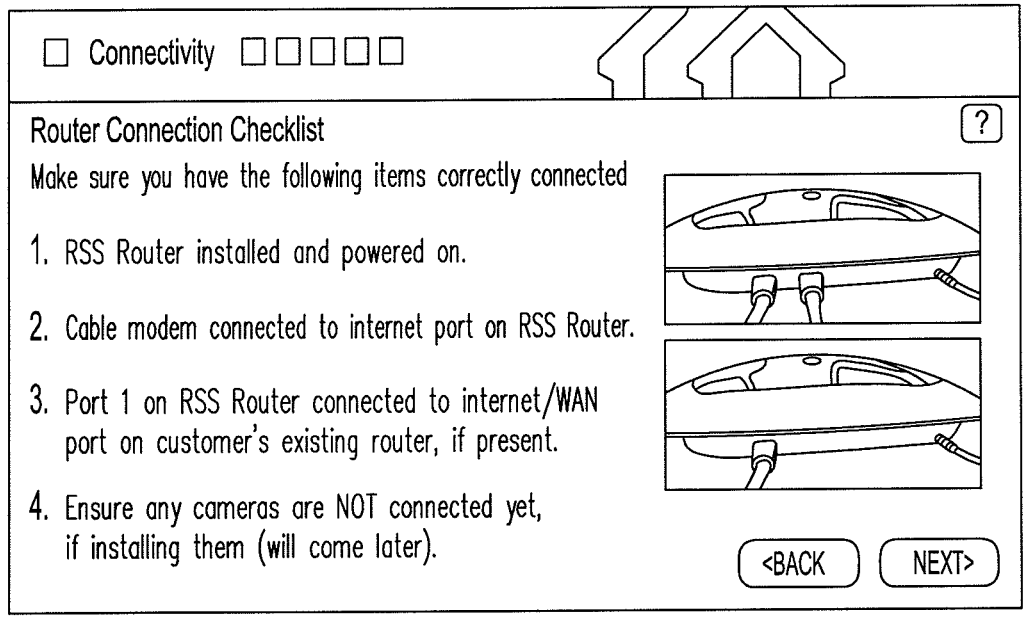

FIG. 13B illustrates a router connection check list display that can be provided to a user upon selection of a wireless network type (720). FIG. 13B illustrates with words and pictures a proper connection of a WiFi-capable router usable for network connections in conjunction with SMA controller 120. A person performing the install of the SMA controller can confirm through use of the touch screen that the steps illustrated in the router connection check list have been performed.

Figure 13C:
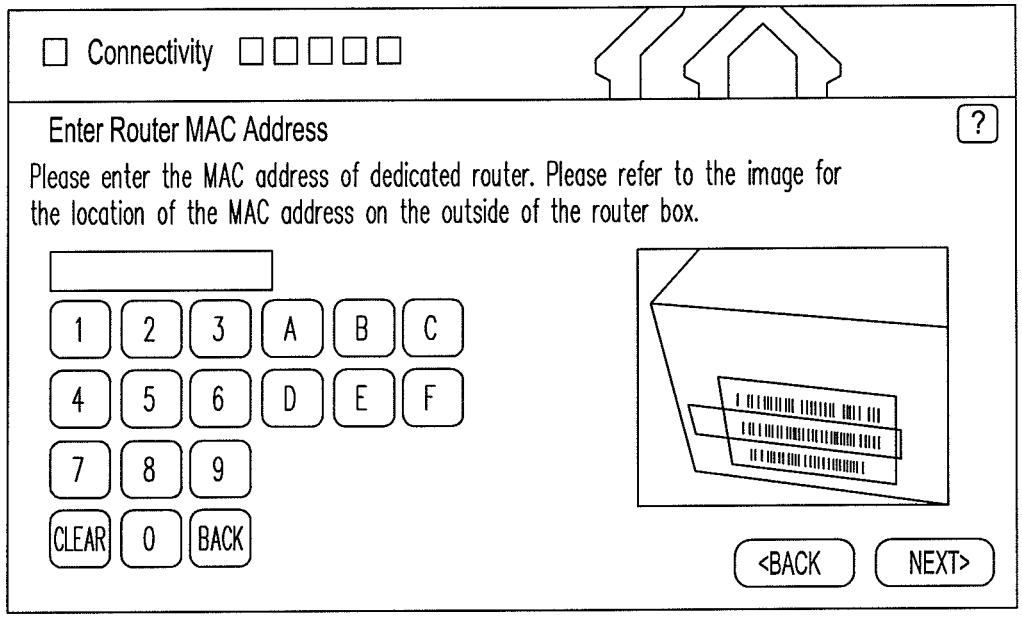

FIG. 13C illustrates a display requesting input of a router MAC address associated with router 125 (723). As illustrated, this display can include a picture showing where the person performing the activation can locate the router MAC address and what the router MAC address looks like. The installer can then use the displayed touch pad to input the router MAC address (723). Once entered, SMA controller 120 can store the router MAC address in an appropriate memory location (e.g., memory 260). Once the installer confirms input of the router MAC address, the SMA controller can perform tasks related to locating the corresponding router (e.g., pinging the MAC address using either WiFi transceiver 235 or the broadband module 230) (725). Alternatively, the SMA controller can use WiFi transceiver 235 and broadband module 230 to scan for available routers in home domain 110. The SMA controller can then display the MAC addresses of the available routers for selection by the person performing the activation.

Figure 13D:
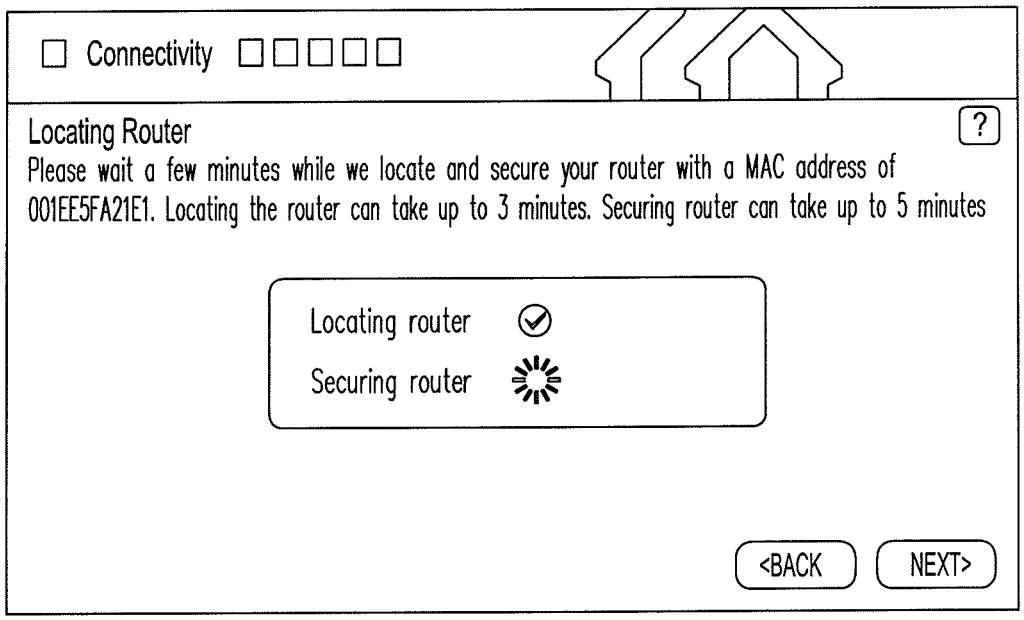

FIG. 13D illustrates a display that can be provided on the SMA controller touch screen display during a process of locating and provisioning the router associated with the input MAC address. SMA controller 120 will attempt to communicate with router 125 through the use of, for example, WiFi transceiver 235 or a broadband connection module 230. Once located, the SMA controller can communicate with the router using, for example, a Home Network Administration Protocol (HNAP) in order to secure the router. Securing the router can take a number of forms including, for example, providing a randomly-generated password and initiating a WEP2 security protocol (727). A determination can then be made as to whether the router was located and secured (730). If the router was not properly located and secured, then the process flow can return to the router connection check list 720 for another attempt at entry of the MAC address and locating and securing the router. Alternatively, the provider of the router and SMA controller can secure the router using remote access, prior to or in conjunction with installation of the SMA controller.

If the router has been located and secured, then the process flow can continue to a creation and securing of a private network (e.g., private WiFi network) on the router (733). Again, commands transmitted to the router for creation and securing of the private WiFi network can be provided through use of the HNAP protocol in accord with appropriate commands stored in the firmware of SMA controller 120. It should be noted that this process of securing a private WiFi network can be combined with securing the router.

Figure 13E:
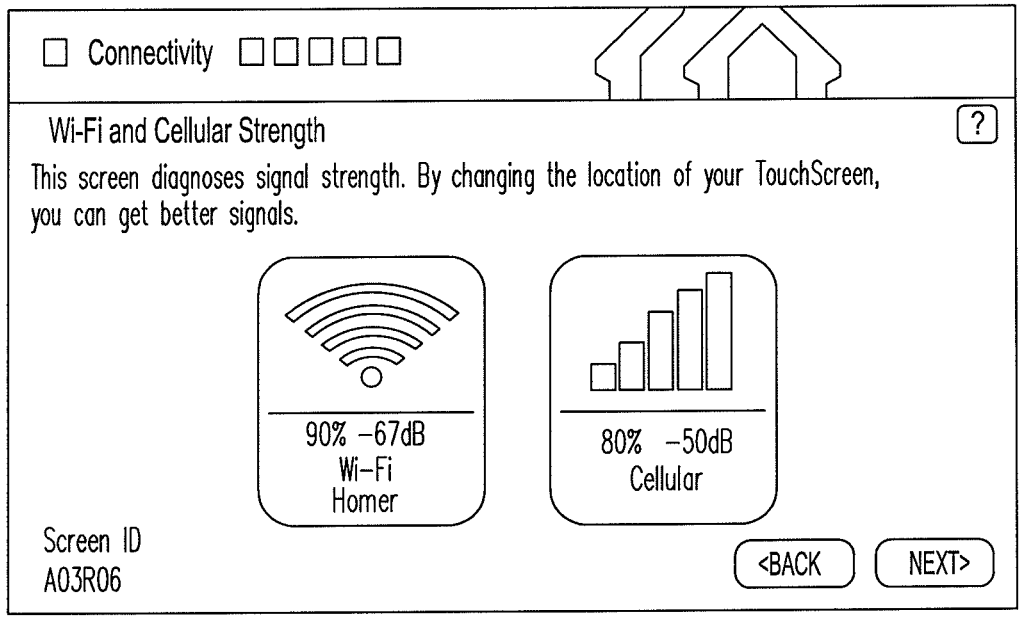

Once router 125 is secured and the private WiFi network has been created and secured, SMA controller 120 can interpret the strength of radio signals being received by WiFi transceiver 235 and cellular transceiver 240 (735). The SMA controller can then display the WiFi and cellular signal strengths using a display such as that illustrated in FIG. 13E, showing graphical representations of the radio signal strength. A person performing the install can then opt to move SMA controller 120 to a different location within home domain 110 to optimize the displayed WiFi and cellular signal strengths.

The SMA controller can be provisioned for a particular cellular (e.g., GSM) network, as pre-configured by a provider of the SMA controller. When the SMA controller communicates with a server in the operator domain (as discussed below), any configuration updates, including those related to GSM provisioning, will be downloaded from the server to the SMA controller. The SMA controller will provide signal strength information regarding the cellular network for which the SMA controller is provisioned, and will use that cellular network as an available communication path.

Figure 13F:
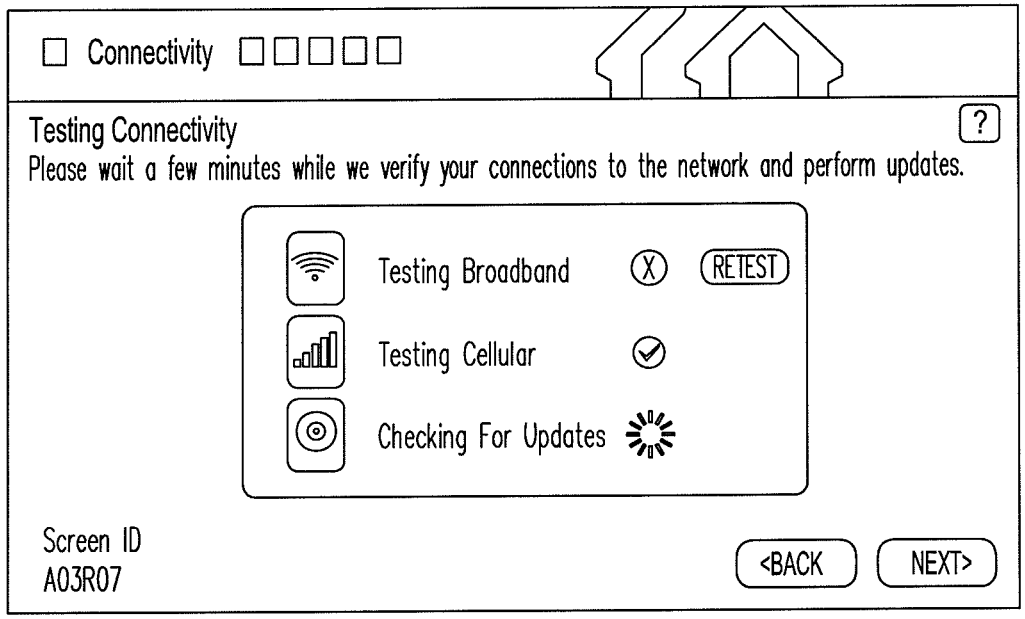

FIG. 13F illustrates an image that can be displayed when SMA controller 120 performs a connectivity test of the broadband/WiFi and cellular networks (737). During such a connectivity test, SMA controller 120 can communicate with servers in operator domain 160 via either router 125 or a cellular network 150. One or more signals can be transmitted between the SMA controller and the server in the operator domain in order to confirm connectivity and quality of the connection.

Once connectivity has been established and confirmed through the available networks, SMA controller 120 can communicate with an operator domain server (e.g., server 165) to determine whether a firmware or configuration update is available for the SMA controller (740). If there are no updates, then the workflow can proceed to the next activation stage (e.g., account setup 620) (747). If an update is available, then the SMA controller can download and store the update from the server (743). Upon completion of the update download, the SMA controller can perform a process to install the update (e.g., firmware) and reboot (745). Once the update has been installed, the activation process flow can continue to the next stage (747).

FIG. 7 also illustrates a similar activation process should the selected home network be a power-line network environment (e.g., HomePlug). A power-line network adapter check list can be displayed on a touch screen coupled to SMA controller 120 (750). The SMA controller can attempt to locate the power-line network adapter (753) and if successful, can send appropriate commands to the power-line network adapter to secure the power-line network adapter (755). Such commands can include providing a randomly generated password and the like. A determination can then be made as to whether the power-line network adapter was successfully located and secured (757), and if not the process can return to the display of the power-line network adapter check list for another attempt.

If the power-line network adapter is successfully located and secured, then the SMA controller can determine cellular signal strength through the use of cellular transceiver 240 and then display that signal strength using a display similar to that illustrated in FIG. 13E (760). A connectivity test can then be performed for both the broadband/power-line network and cellular networks (763). As discussed above, such a connectivity test can include sending a signal via the available communication modes to a server in operator domain 160.

Once connectivity to the servers has been established, the SMA controller can determine whether a firmware or configuration update is available (765), and if not can proceed to the next activation stage (747). If an update is available, then SMA controller 120 can download and store the update (743) and install the update (745). Once the update has been completed, then the SMA controller can continue to the next activation stage (747).

It should be noted that in the absence of the presence of an available broadband communication path to the remote servers, the SMA controller can still determine connectivity via the provisioned cellular network. A configuration workflow can make such a determination and provide the appropriate signal strength and connectivity testing.

Figure 8:
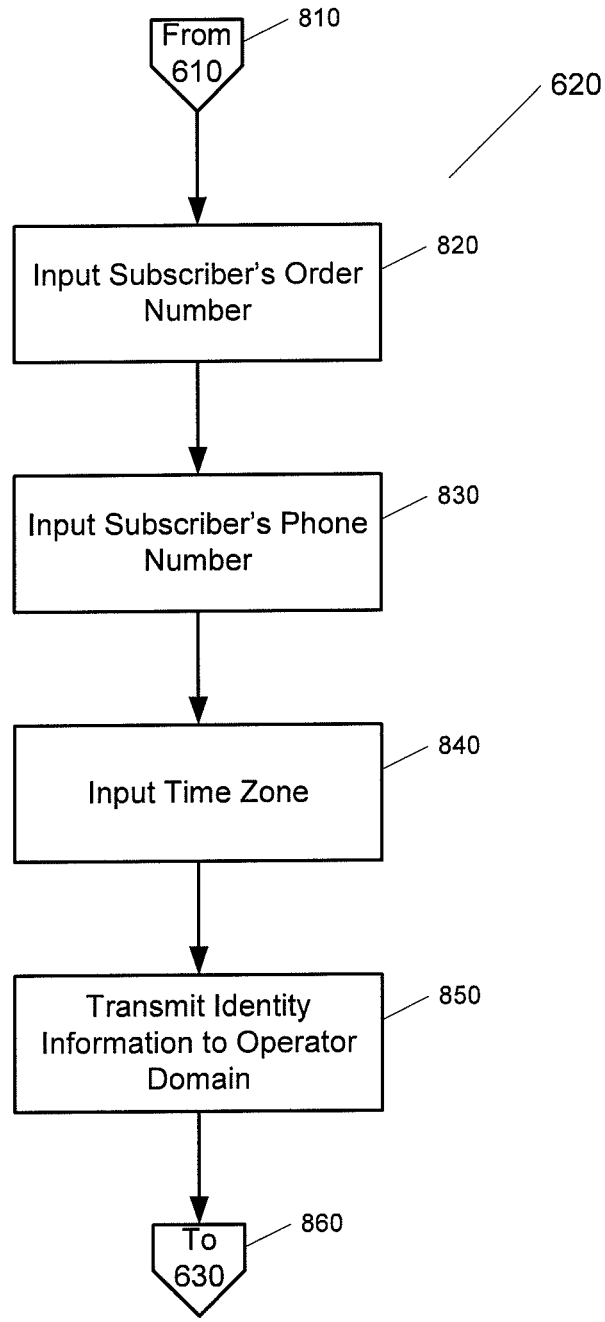
FIG. 8 is a simplified flow diagram illustrating an example of an account setup workflow usable by embodiments of the present invention.

FIG. 8 is a simplified flow diagram illustrating an example of an account setup workflow 620, in accord with embodiments of the present invention. Once a network has been configured and connectivity established to the operator domain of a provider of SMA services, a person conducting the activation process may then be required to provide account information to the provider so that the SMA controller can access software and services available to the subscribing end-user.

Figure 13G:

As illustrated, the process of FIG. 8 is entered after completion of the network process 610 (810). An opportunity is provided for input of a subscriber's order number or other identification of the end-user subscriber (820). FIG. 13G illustrates one example of an order number entry display for a touch screen coupled to SMA controller 120. A person conducting the install can enter the customer's order number using the displayed touch pad, and the order number can be stored by the SMA controller in a local memory (e.g., memory 260). Similarly, an opportunity is provided for the person conducting the install to input the subscriber's telephone number (830) and the subscriber's time zone (840), which can also be stored. To the degree that differing providers of SMA services may require additional or different information to be provided to identify a subscriber, the SMA controller can be configured to request that information and to store that information in preparation for transmission to a server in the operator domain. Once all the required account information has been provided, SMA controller 120 can transmit the identifying information to a server in operator domain 160 via the configured network (850). In addition, the SMA controller can provide information identifying the SMA controller hardware (e.g., serial number or other hardware identification), along with network address information, that can be associated with the account information in the operator domain (e.g., in database server 185).

Through the use of this information, the provider of SMA services can verify the on-site setup of the SMA controller. In addition, the provider can also track the hardware installed in the home domain for installation inventory purposes, as well as future firmware updates for the SMA controller.

Figure 9:
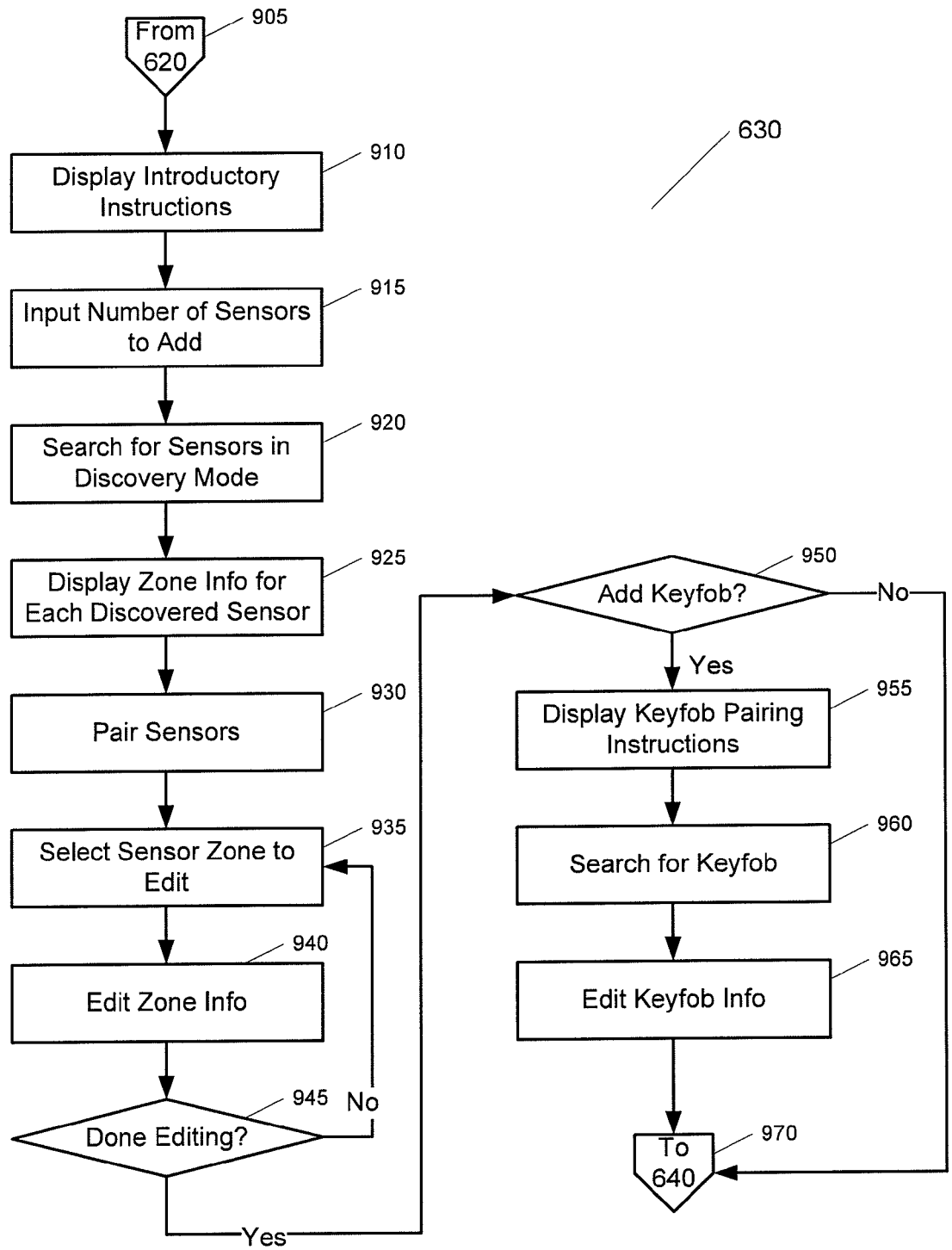
FIG. 9 is a simplified flow diagram illustrating a process for configuring security sensors usable in embodiments of the present invention.
Figure 13H:

FIG. 9 is a simplified flow diagram illustrating a process for configuring security sensors (e.g., 510), in accord with embodiments of the present invention per sensor setup stage 630. As illustrated, this sensor configuration stage flows from account setup stage 620 (905). A user of a security system incorporating SMA controller 120 (e.g., an installation technician or resident of home domain 110) can decide, based upon the needs within the home domain, the types and number of security sensors needed to secure the home domain. The SMA controller, via a touch screen input device, for example, can display introductory instructions related to the sensor configuration process (910). The introductory instructions can include, for example, textual and/or visual instructions for putting standard sensors that are packaged with the SMA controller into discovery mode. The SMA controller can then provide an input display for the person performing the configuration to input how many sensors the SMA controller should search for during this process (915). FIG. 13H illustrates an example display for selecting a number of sensors an installer would like to add to the system. The illustrated display also provides a search time that automatically adjusts to the selected number of sensors.

Figure 13I:
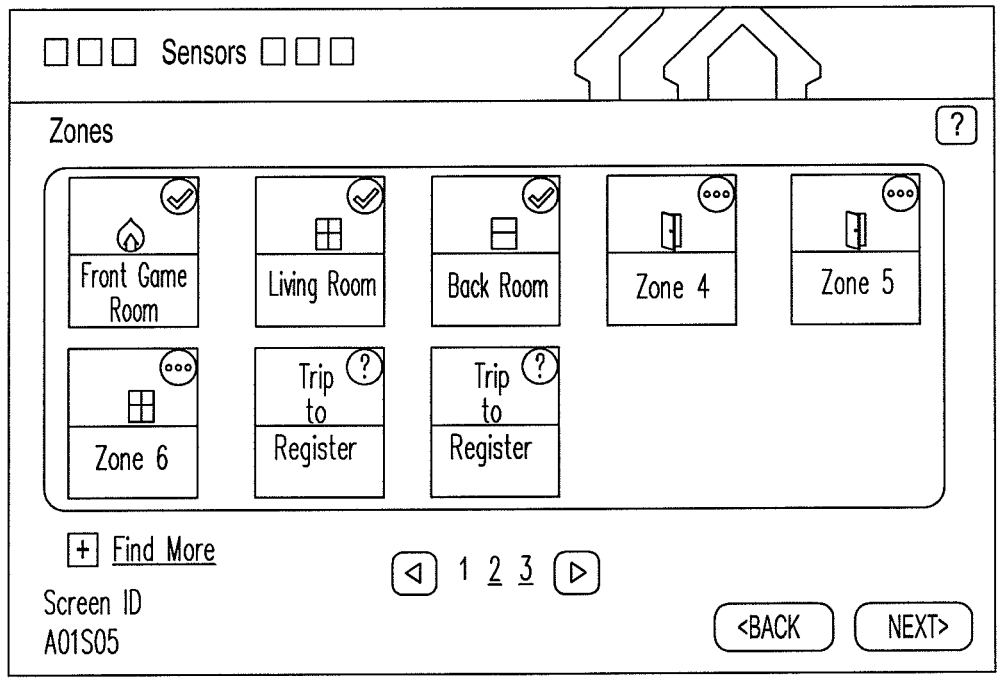

The SMA controller can then search for all sensors that are in discovery mode (920). Additionally, the SMA controller can display a remaining search time indication. A linking message from a sensor can provide information including, for example, a unique identification number for the sensor and sensor type information. An SMA controller touch screen interface can then display zone information associated with each discovered sensor (925). FIG. 13I illustrates an example of a detected zones display that can be provided by the SMA controller. Each sensor can then be paired (e.g., by tripping the sensor) (930). The search and pairing process provides detailed information regarding each sensor to the SMA controller.

Once presented with the information related to all the located sensors, a user can then edit that information to provide specifics as to physical, or zone, location of the sensor within the home domain and other characteristics related to the zone of the sensor. The person performing the activation process can select a sensor zone to edit (935) and then define or edit the information related to that sensor (940). The information related to the sensors and zone can then be stored in a local memory of SMA controller 120 (e.g., memory 260). The SMA controller can also transmit the sensor zone information to be stored in a server in operator domain 160 via the broadband connection.

Figure 13J:
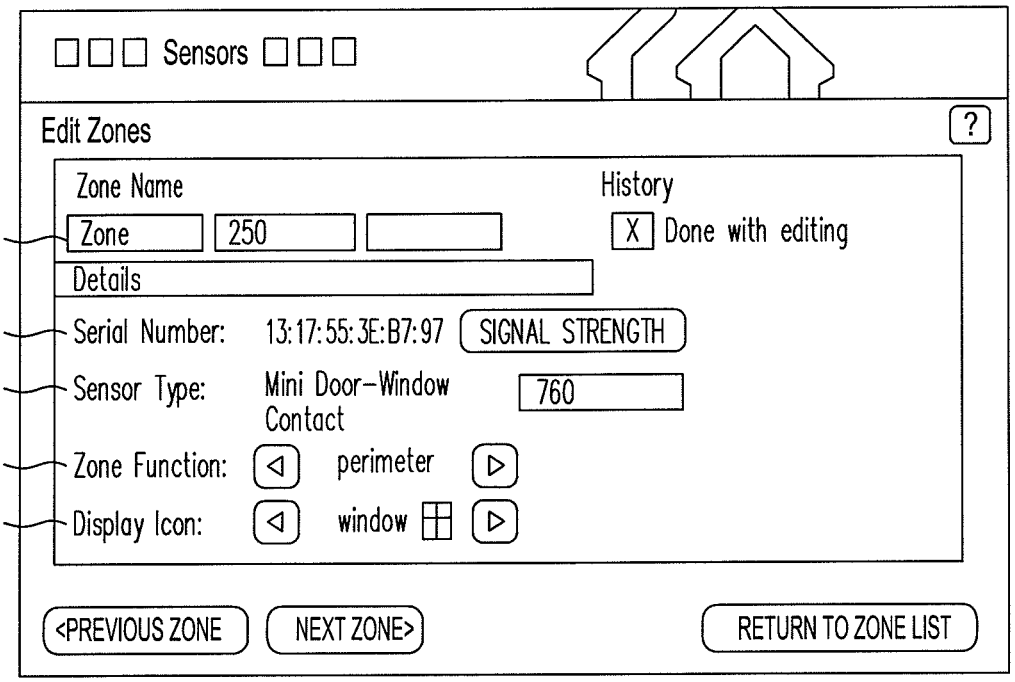

FIG. 13J is an illustration of a display that can be provided by embodiments of the present invention to permit editing of sensor information (e.g., sensor zone information). As illustrated, the display can provide information such as a unique identifier of the sensor (serial number 1310) and sensor type (sensor type 1320). As indicated above, unique identifier and sensor type information is provided by the sensor during the search and location process. Through a display such as that illustrated in FIG. 13J, a user performing the activation can define additional zone characteristics related to the sensor. For example, a user can define or select a zone name 1330 to associate with the sensor. The zone name can be entered, for example, by the user through use of a touch screen-based keyboard or selected from a list of common names displayed on the touch screen.

A zone function 1340 can also be provided to be associated with the sensor. A zone function determines behavior of the zone and is dependent on the zone type. For example, a door/window sensor can function as an entry/exit zone or as a perimeter zone. Each zone type can have one or more configurable zone functions. For example, a motion detector can have a zone function of interior follower, a smoke/heat detector can have a zone function of 24-hour fire monitoring, a glass-break detector can have a zone function of a perimeter zone, and an inertia detector can have an entry/exit zone function or a perimeter zone function.

Selection of a zone function definition can alter how the security system acts and reacts to signals received from a sensor in that zone. The following table illustrates examples of zone functions and their associated action/reaction definitions, according to one embodiment of the present invention.

TABLE 1

| Zone Function | Definition |
| --- | --- |
| Entry/Exit | Allow exiting the home domain when the system is arming and will begin an entry delay when opened if the system is armed. Zone can be bypassed and can have specific tones assigned for open and close events. |
| Perimeter | Generate an alarm immediately if tripped while the system is armed. Can be bypassed and can have specific tones assigned for open and close events. |
| Interior Follower | Protect the internal spaces of the home domain and trigger an immediate alarm if the system is armed in away mode. Zone is not armed when the system is in armed stay mode. Can be bypassed and can have specific activity/non activity tones assigned. |
| 24-Hour Fire | Generate an immediate fire alarm if triggered. Zone cannot be bypassed. |
| 24-Hour Monitor | Generate notifications in the home and will beep the keypad but will not sound the full alarm. Can be bypassed. |
| 24-Hour Environmental | Generates notifications, beeps keypads, and sounds the siren to let people within the home domain know to evacuate the premises. Cannot be bypassed. |
| 24-Hour Inform | Will never generate an alarm, even if the system is armed. Upon triggering of the sensor will make the configured sound and send events to the operator domain. Can be bypassed. |

By defining such zones, a user can control how the security functions of SMA controller 120 react to various sensor triggers.

A user can also configure a display icon 1350 associated with the sensor zone. In many cases, the available icons will be limited to one type of icon that graphically relates to the sensor type. But, for example, with a door/window sensor, icons can be made available that illustrate a door or a window as appropriate. FIG. 13J further illustrates a signal strength button 1360 that, when selected, can display strength of the signal between the wireless hub located within SMA controller 120 and the associated sensor. Alternatively, signal strength can be displayed on the display of FIG. 13J.

Sensor zone information, entered through the use of a display such as that illustrated in FIG. 13J, can be stored in local data tables that are stored in memory 260 of SMA controller 120. In addition, sensor zone information can also be transmitted via access domain 150 to servers in operator domain 160 for storage (e.g., database server 185). By storing the sensor zone information in servers in the operator domain, the information is available to a user accessing a portal server 170 (e.g., for monitoring of sensor events). Operator domain storage of configuration information allows remote access to the configuration information (e.g., using a portal server 170). Operator domain storage further allows provisioning a replacement SMA controller should, for example, an original SMA controller become unusable or an SMA controller undergo a factory reset and need reconfiguration.

A user performing an activation/configuration process of the SMA controller can be given an opportunity to edit each discovered sensor zone (945). Once the user has completed the process of editing sensor zones, the user can be provided an opportunity to add a key fob-type device (950). If the user chooses to add the key fob-type device, pairing instructions for key fobs can be displayed (955). Once the key fob-type device is put into a discovery mode, the person performing the activation can instruct the SMA controller to search for the key fob-type device (960). Once the key fob-type device has been found, the user can edit the key fob information in a manner similar to the zone information editing (965). Information such as a person to be associated with a particular key fob and the like can be provided. Once a key fob-type device has been added or addition of a key fob has been bypassed, the activation process can continue to the next stage (970). Again, the information related to the added key fobs can be transmitted by the SMA controller to the operator domain for storage and monitoring.

Figure 10:
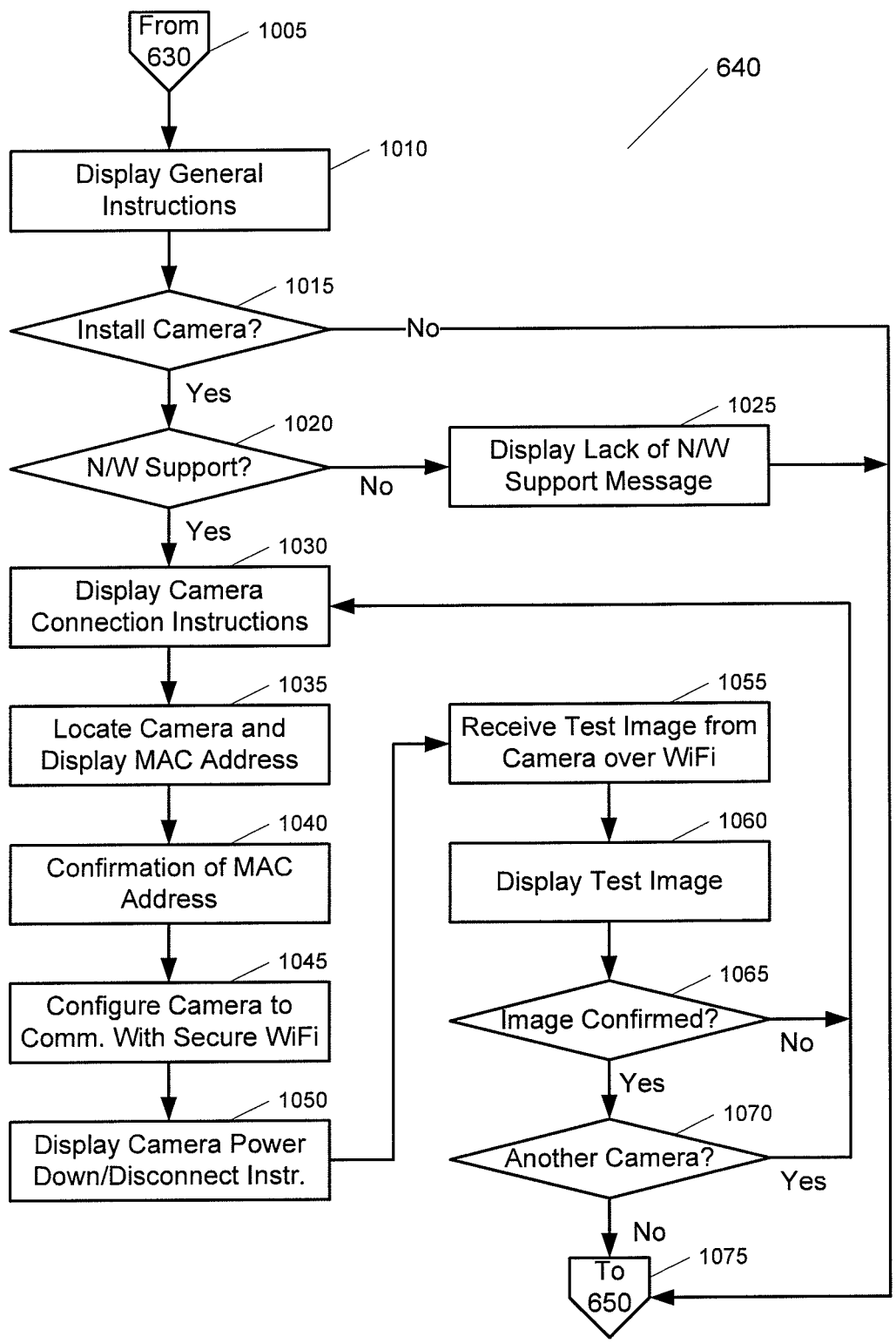
FIG. 10 is a simplified flow diagram illustrating a process for adding cameras or other monitoring devices during the activation process of an SMA controller usable in embodiments of the present invention.

FIG. 10 is a simplified flow diagram illustrating a process for adding cameras or other monitoring devices during the activation process of an SMA controller. FIG. 10 illustrates details related to process step 640 of FIG. 6. Although FIG. 10 and the accompanying description mentions camera-type monitoring devices, it should be understood that other types of monitoring devices that are RF connected to the SMA controller can also be incorporated in the following discussion.

The process illustrated in FIG. 10 can be entered into after performing processes related to step 630 (1005). SMA controller 120 can display, on an associated touch screen display, general instructions related to activation and installation of a camera monitoring device (1010). An opportunity can then be provided for the person performing the activation to indicate whether one or more camera monitoring devices will be installed (1015). If no camera is to be installed, then the process can continue on to the next stage of the activation workflow (1075). If the user indicates that they wish to install a camera, then a determination can be made by the SMA controller as to whether the configured network supports a camera monitoring device (1020). For example, if the configured network does not support WiFi connections but the designated camera monitoring device requires a WiFi network, then a camera monitoring device installation cannot proceed. In such a case, the SMA controller can display a message indicating lack of network support for such a camera monitoring device (1025) and then the process can proceed to the next stage of the activation workflow (1075). Typically, though, the camera monitoring device installation workflow will not be entered if the previously configured network cannot support a camera monitoring device (e.g., a power-line network).

If the person performing the activation wishes to install a camera and the configured network supports such a camera, then the SMA controller can display instructions for preparing the camera monitoring device to be configured to communicate with the secure WiFi network of the SMA controller (1030). For example, an initial configuration of a wireless camera may require an initial hardwired connection to router 125 in order for the SMA controller to provide appropriate instructions for configuration of the camera. Thus, the instructions displayed by the SMA controller may include text and pictures of how to couple the camera monitoring device to the router for this stage of the process.

The SMA controller can also provide the user performing the activation process an opportunity to indicate when the camera monitoring device is coupled to the router or otherwise ready for configuration. The SMA controller can then communicate with the router (e.g., using HNAP) to locate the camera and to receive a MAC address of the camera from the router (1035).

Figure 13K:
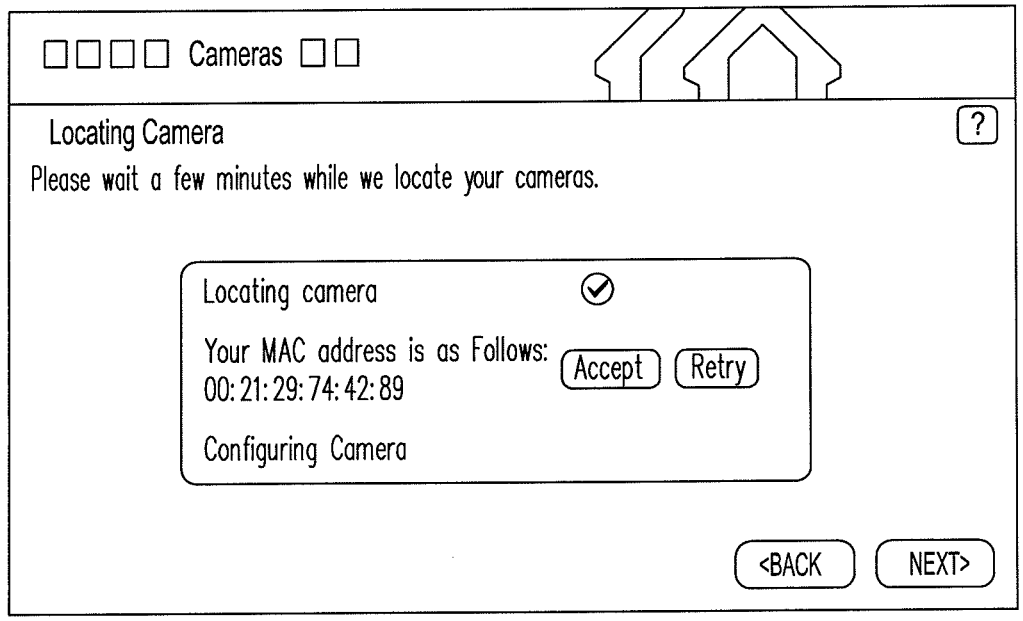

FIG. 13K illustrates a display that can be provided on a touch screen of SMA controller 120 during a process of locating the camera monitoring device and displaying the found MAC address. As illustrated in FIG. 13K, the SMA controller can give the person performing the activation process an opportunity to accept the found MAC address or to perform a retry operation to discover another appropriate MAC address (1040). Once confirmed, the SMA controller can then configure the camera monitoring device to communicate wirelessly with the router using the secure WiFi network and, hence, the SMA controller (1045). The SMA controller can use the display of FIG. 13K to provide positive notification of the process of camera configuration.

Figure 13L:
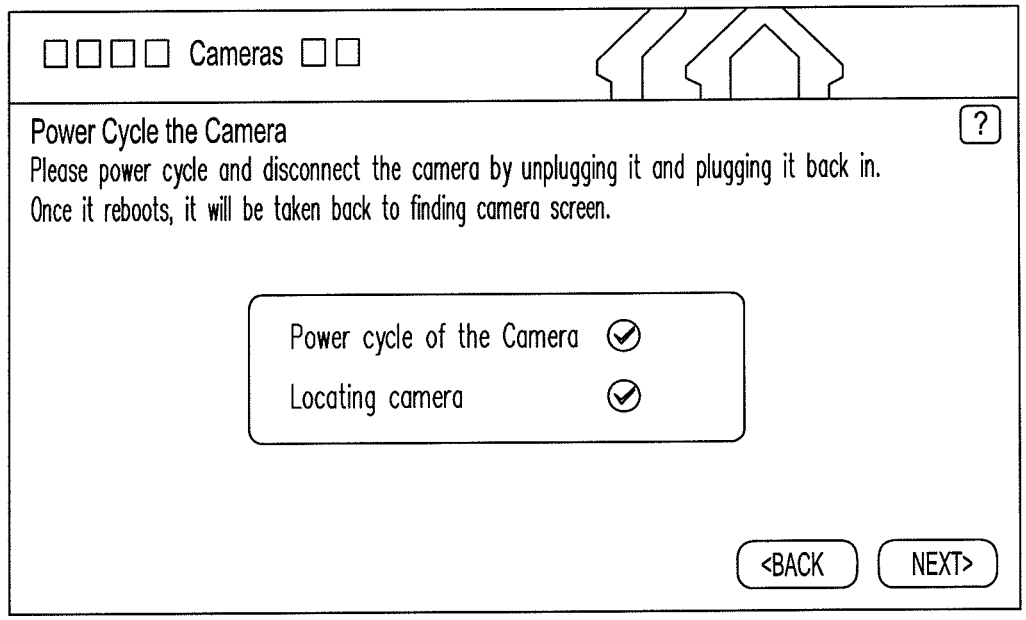

Once the camera configuration process has been performed, the SMA controller can display additional instructions related to re-configuring the camera monitoring device hardware to communicate wirelessly over the secured WiFi (1050). FIG. 13L illustrates an example of a display providing such instructions. In the illustrated example, the person performing the activation process is instructed to cycle power to the camera monitoring device and to disconnect the Ethernet cable connecting the camera with the router. When the camera is powered back up, the camera will then acquire an IP address over the secured WiFi network from router.

During the configuration process, the SMA controller can pass a variety of information to the camera, including, for example, an administrative user name and password, camera name, camera description, time zone, current time, language, user session name and password for list of users allowed to access the camera, network settings such as IP address and name servers, protocol settings, motion detection settings, and desired camera image settings such as resolution and video adjustments. In addition, the camera can provide information to the SMA controller for storage, such as, for example, device type, manufacturer, model number, and other control information. All of this information can be passed between the SMA controller and the camera monitoring device without user interaction beyond the initial configuration of the camera hardware.

Once the SMA controller and camera are configured to communicate with one another, then images generated by the camera can be displayed on a display device associated with the SMA controller. The process flow illustrated in FIG. 10 provides for a test image to be received from the camera over the secure WiFi network (1055) and displayed on the display device coupled to the SMA controller (1060). The SMA controller can then give the user performing the activation process an opportunity to confirm receipt of the image (1065), and if no image has appeared can return the process flow back to the initial configuration instructions for the camera monitoring device (1030). If the image is successfully received and confirmed, then an opportunity can be given for configuration of a subsequent camera monitoring device (1070). The SMA controller can also transmit the monitoring device configuration information to a server in operator domain 160 for storage, as with the sensor zone configuration information. Should the user opt to not configure a subsequent camera monitoring device then the process flow can continue to the next stage of the activation workflow (1075).

Figure 11:
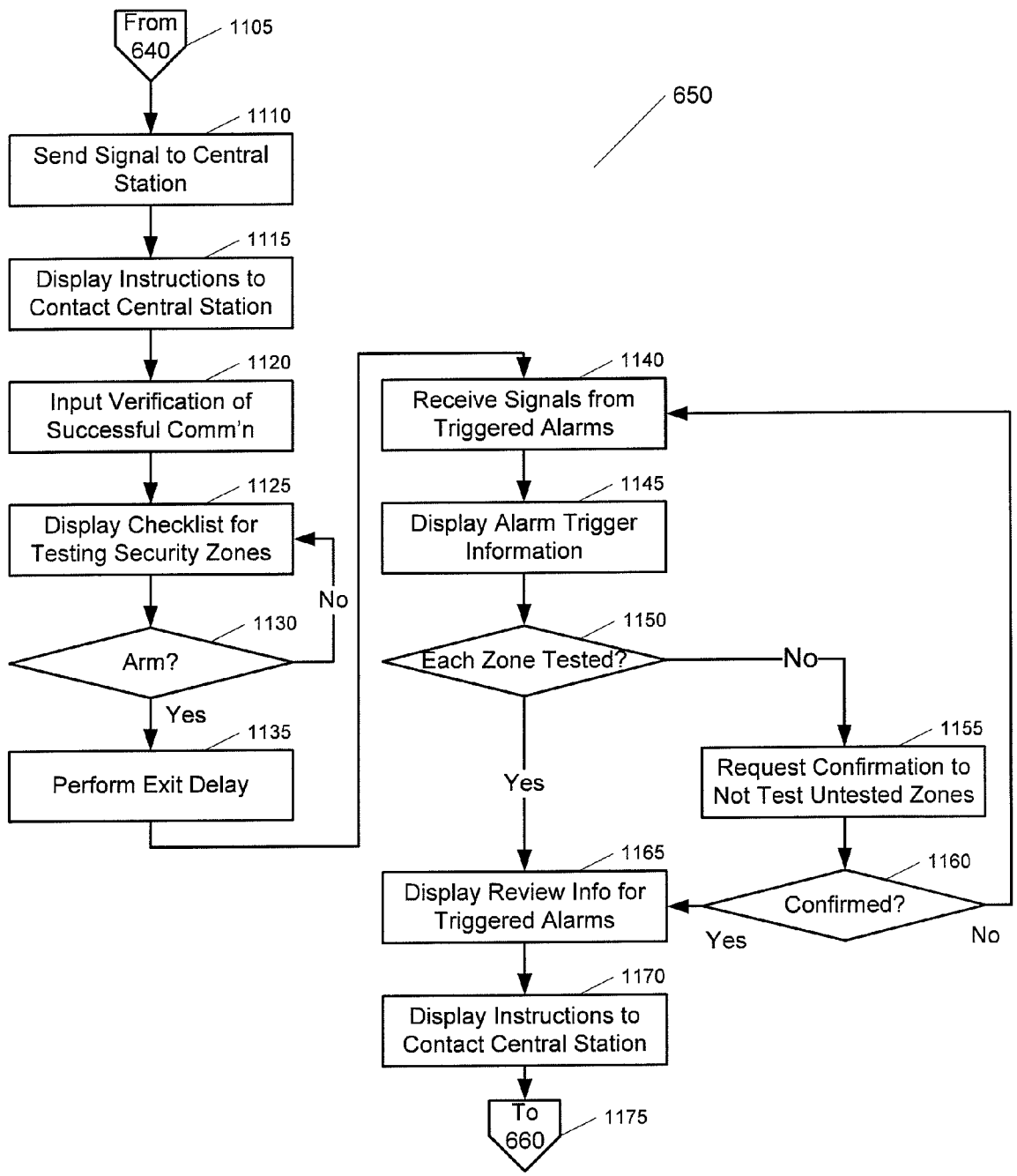
FIG. 11 is a simplified flow diagram illustrating an example process flow for alarm path communication testing usable in embodiments of the present invention.

FIG. 11 is a simplified flow diagram illustrating an example process flow for alarm path communication testing 650. As discussed above, the process for FIG. 11 is performed subsequent to configuration of the SMA controller network and various alarm sensors. The process illustrated in FIG. 11 can be used to confirm the communication path between SMA controller 120 and central station 190. Both a general communication with the central station can be tested as well as receipt and interpretation of events associated with specific sensors coupled to the SMA controller.

Figure 13M:
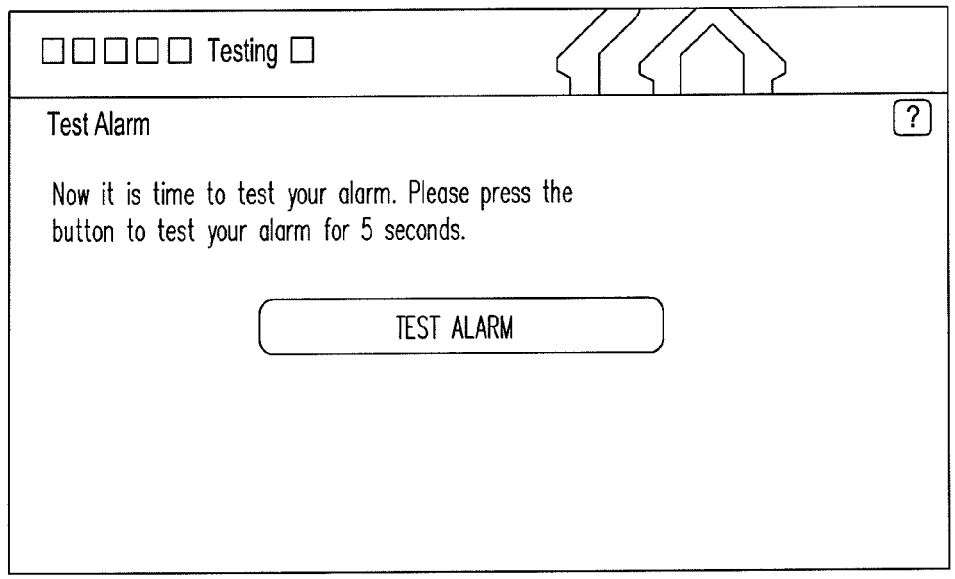
Figure 13N:
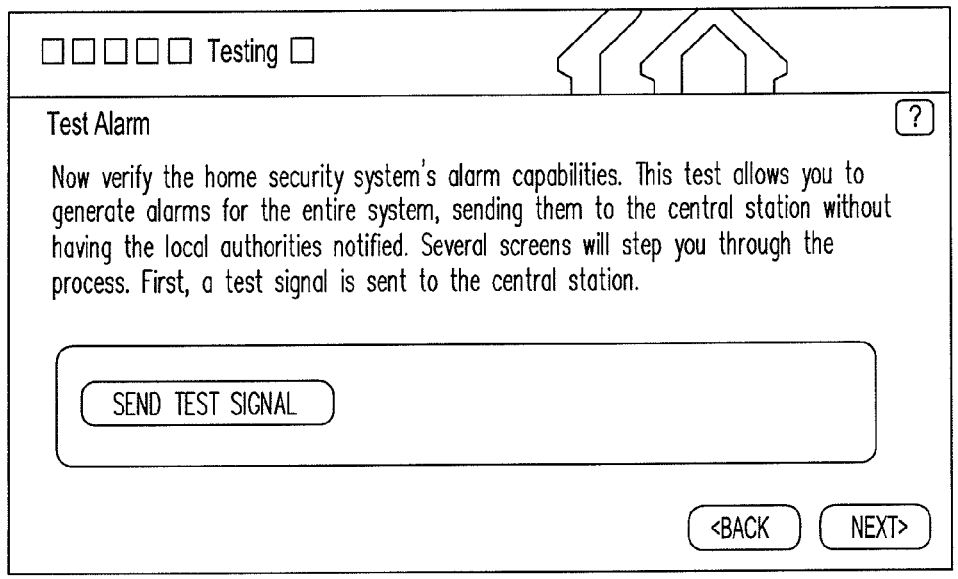

As illustrated in FIG. 11, the process for alarm path communication testing can be entered subsequent to configuration of the network (1105). To confirm the presence of a communication path with an appropriate central monitoring station, the SMA controller can send a signal to the central station (1110). FIG. 13M illustrates an example of a test alarm display that can be displayed on a touch screen associated with SMA controller 120 to begin the alarm test process. As illustrated, a test button is displayed that should be pressed to begin the alarm test sequence. FIG. 13N illustrates an example display that can be used to prompt a user performing the activation to send the test signal. A central station will receive a message (e.g., a "Contact ID 601-Manual Trigger Test Report") and the user will not be given an opportunity to get past this screen until an acknowledgement message is received from an alarm server in operator domain 160 (e.g., server 165).

Once the acknowledgement is received, the SMA controller can display instructions to the user performing the activation process to contact the appropriate central station to confirm the alarm transmission (1115). Such instructions can include, for example, a phone number for the central station that can be provided by a server in the operator domain upon the initial account setup process 620. The SMA controller can give the user performing the activation process an opportunity to input a verification of a successful communication with the central station (1120). In an alternative embodiment, the SMA controller can be configured to receive an automated confirmation of communication to central station 190 from the central station or from an operator domain server 165. The SMA controller can then display information regarding the automated confirmation on a coupled display to the user performing the activation process.

Figure 13O:
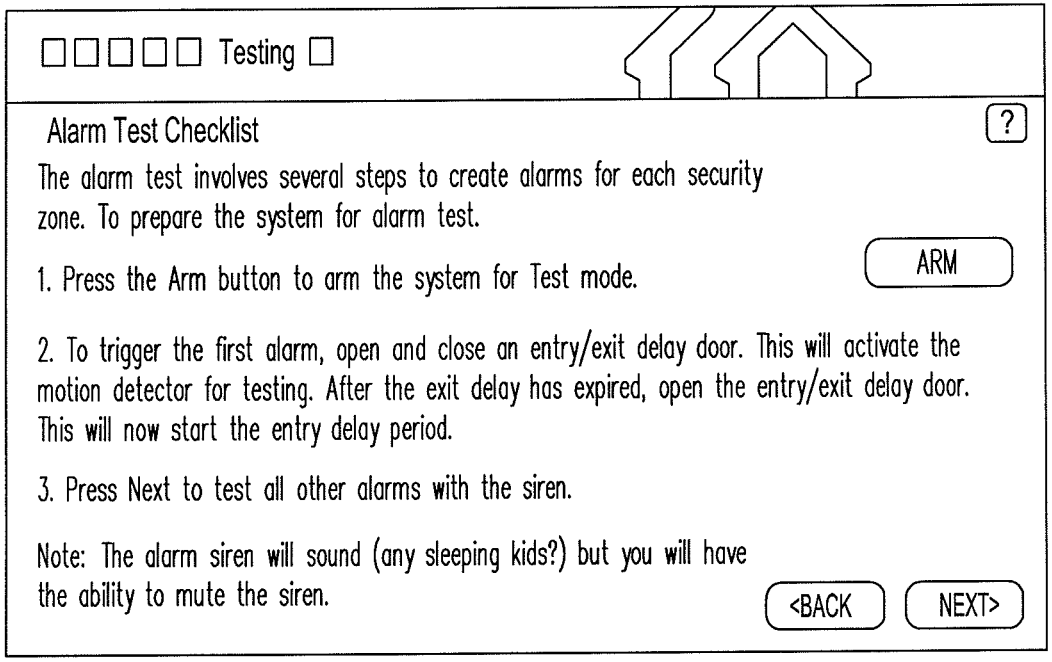

Once the communication path with the central station has been confirmed, the SMA controller can display a check list for testing each configured zone of the system (1125). FIG. 13O illustrates an example of such an alarm test check list that can be displayed in accord with embodiments of the present invention. As illustrated, the check list provides the user an opportunity to arm the system for test mode (1130). Once armed, the SMA controller performs an exit delay sequence (1135) during which, if a sensor is tripped, no alarm will be sent to the central station if the alarm is reset from a tripped state. The check list then provides for the user performing the activation process to trigger an alarm sensor, which will then transmit an alarm signal to the SMA controller (1140).

Figure 13P:
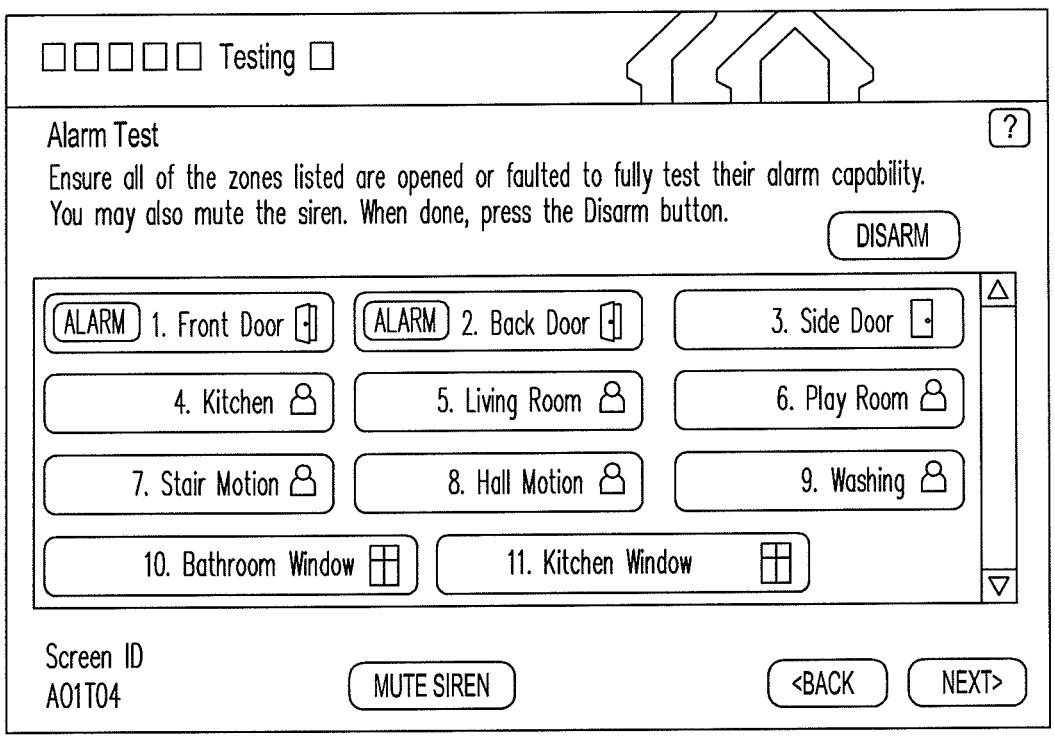

When the alarm sensor is triggered, the SMA controller can display information related to the alarm trigger (1145). FIG. 13P illustrates an example of an alarm test display that can be provided by embodiments of the present invention. Each triggered zone is illustrated in the alarm test zone display. When the user has triggered all desired alarms, the user can input to go to the next step. The SMA controller can then determine whether each configured zone has been tested (1150), and, if not, the SMA controller can request confirmation from the user to not test the untested zones (1155). In the event that the user wishes to test additional zones, the SMA controller can provide an opportunity to trigger additional alarms (1140).

Figure 13Q:

If each zone has been tested or each desired zone has been tested, then the SMA controller can display review information for the various triggered alarms (1165). FIG. 13Q illustrates an example of a review alarms display that can be provided by SMA controller in accord with embodiments of the present invention. In addition, instructions to contact the central station to confirm the various alarm information has been received can also be displayed (1170). The user performing the activation process can go through the alarm review list with the central station representative to confirm proper receipt of all alarm information. Once this alarm review process has been completed, the process can continue on to the next stage of the configuration workflow (1175).

In an alternative embodiment, the SMA controller can be configured to receive an automated confirmation of communication of alarm information to central station 190 from the central station or from an operator domain server 165. The SMA controller can then display information regarding the automated confirmation on a coupled display to the user performing the activation process. Such an automated process of alarm information confirmation decreases the time that is needed to perform an installation and testing of the SMA controller setup.

Figure 12:
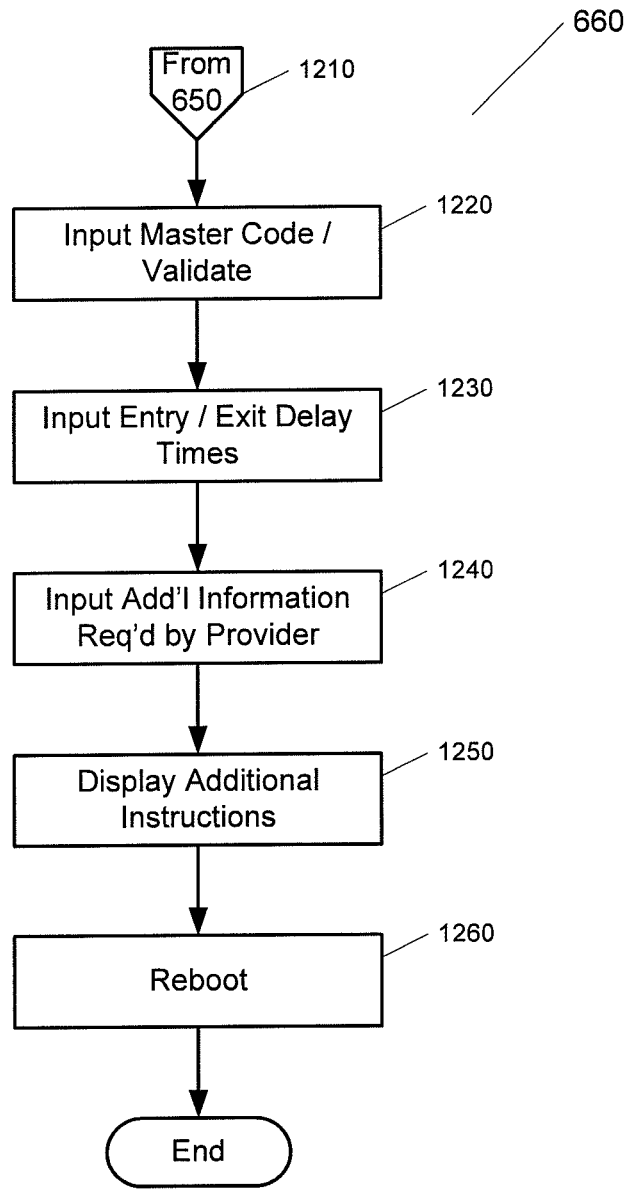
FIG. 12 is a simplified flow diagram illustrating a process for post activation workflow usable in embodiments of the present invention.

FIG. 12 is a simplified flow diagram illustrating a process for post activation workflow 660. The process illustrated in FIG. 12 provides for configuration steps not performed under any other section of the general workflow to be performed, as well as steps to complete securing the SMA controller.

Figure 13R:

The workflow of FIG. 12, as illustrated, is entered after completion of the alarm path communication testing sequence 650 (1210). The user performing the activation process can be given an opportunity to enter a master code for SMA controller 120 (1220). FIG. 13R illustrates an example display that can be provided by the SMA controller for setting the master code. As illustrated, a keypad can be provided on the touch screen display and a four-digit number can be entered by the user. The SMA controller then stores the master code for subsequent use. Additionally, the user can be given an opportunity to input alarm event entry and exit delay times (1230). As discussed above, such entry and exit delay time relate to how long the SMA controller will wait after an alarm sensor has been triggered to send an alarm event to a central station and to sound a siren within home domain 110. Default values for entry and exit delay can be displayed and adjustment buttons can be provided by which the user can adjust those delay times to their preference. The entry and exit delays can then be stored on the SMA controller for use during operation.

In an alternate embodiment, steps 1210-1230 can be avoided during the installation procedure by assigning default values for the master code, delay times, and the like. The end user can then at a later time set those values through use of interfaces provided on a display coupled to the SMA controller. Use of default values can reduce the amount of time needed for the install of the SMA controller in the home domain.

The SMA controller can then be configured to provide for any additional information that a provider of operator domain 160 wishes to acquire from a subscribing user (1240). A provider of SMA services can modify these process flow steps as desired or necessitated. Any additional instructions that are desired to be provided to the user performing the activation process can be provided on the display associated with the SMA controller (1250) and then the system can be rebooted to activate the SMA controller in accord with all the settings that have been provided during the activation workflow (1260).

The software architecture that provides for the above-described activation/provisioning workflow is customizable to the demands of a provider of the SMA services. Embodiments of the firmware architecture that provides the activation/provisioning workflow can be implemented, for example, using XML-type control files that define each step of the workflow and the display that accompanies that step of the workflow.

Figure 14:
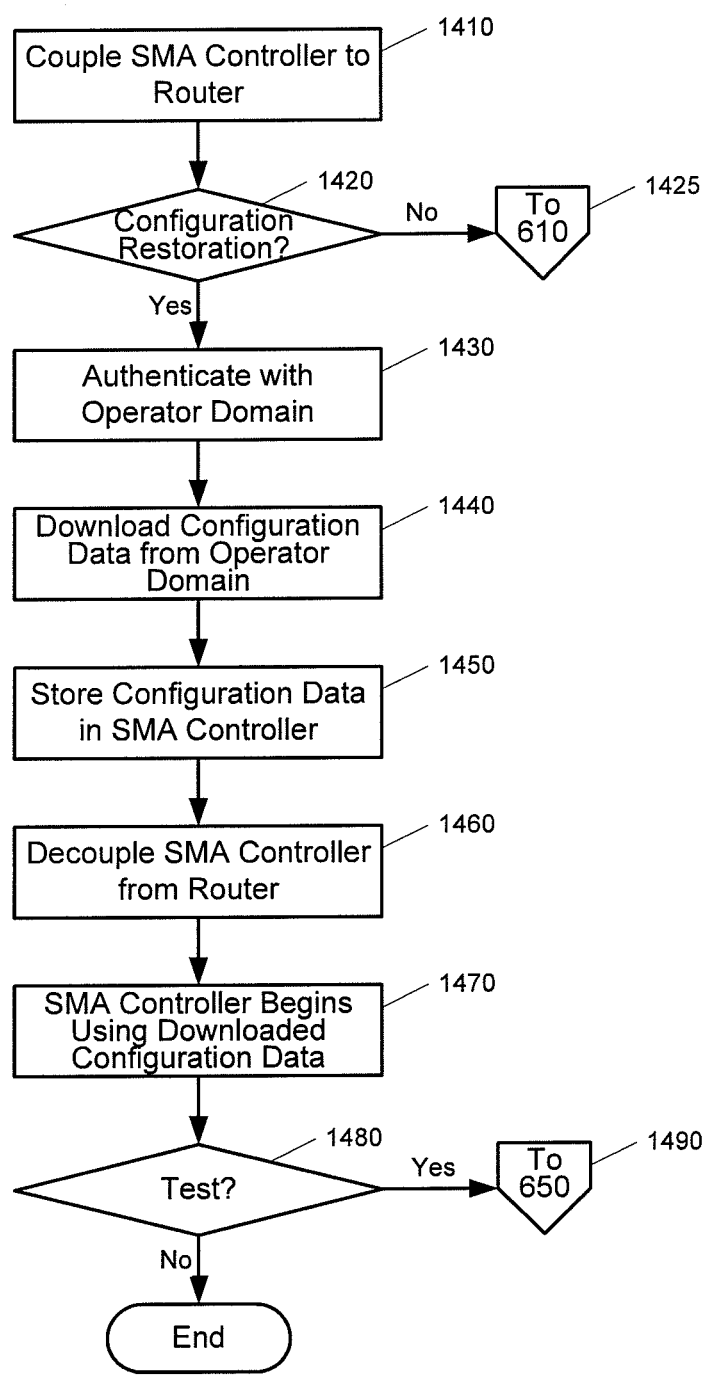
FIG. 14 is a simplified flow diagram illustrating an example of a configuration data restoration workflow for configuring an SMA controller using configuration data previously stored on a remote server, in accord with embodiments of the present invention.

FIG. 14 is a simplified flow diagram illustrating an example of a configuration data restoration workflow for configuring an SMA controller using configuration data previously stored on a remote server (e.g., database server 185 in operator domain 160), in accord with embodiments of the present invention. The workflow in FIG. 14 is an alternative to the activation/provisioning workflow discussed above, allowing for quick restoration of all settings of an SMA controller in the event of, for example, an SMA controller replacement or factory reset. As discussed above, as an SMA controller proceeds with the activation/provisioning workflow steps described above, configuration data is stored both locally (e.g., in memory 260) and transmitted for storage in the operator domain (e.g., in a database server 185). The remotely-stored configuration data can also be updated each time a configuration setting on the SMA controller is changed during normal use (e.g., a change to a pass code or additions of sensors). If an SMA controller requires stored configuration data, then the stored configuration data can be downloaded to the home domain SMA controller to restore the SMA controller to the same configuration without the need for a complete reiteration of the activation/provisioning workflow.

When an unconfigured SMA controller is intended to execute the configuration data restoration workflow, the SMA controller will be introduced into a home domain 110 that has previously been configured per FIG. 7, or the like. But since the unconfigured SMA controller does not have the wireless network information used to configure the secured private network, the SMA controller cannot immediately communicate with that network. Thus, the SMA controller can be coupled directly to the router using a tethered link so that the router can communicate over access domain 150 (1410). Alternatively, the SMA controller can communicate with the router using an unsecured WiFi or power-line network connection.

Once the SMA controller is in communication with router 125, the SMA controller can provide a query to a user of the SMA controller as to whether the present installation is a full installation or a restoration installation (e.g., an RMA installation) (1420). If the selection is for a full installation, then the process continues to a network setup workflow 610 (1425), discussed above. If the selection is for a restoration installation, then the system prompts for the user to provide one or more of a subscriber identifier and an alternative unique identifier (e.g., an RMA authorization code) to authenticate the SMA controller to a server in operator domain 160 (1430).

Once authentication of the SMA controller has occurred, a download is performed of SMA controller configuration data previously stored by a server in the operator domain (1440). The SMA controller can request a download of the previously stored configuration data from the operator domain server, or the operator domain server can automatically perform download operations to the SMA controller once the subscriber identifier is authenticated. The server in the operator domain can search for previously stored configuration data that is associated with the subscriber identifier/unique identifier. All the corresponding previously-stored configuration data is downloaded to the SMA controller and stored in the SMA controller memory in the same manner (e.g., formats and locations) as if it were entered on the SMA controller input device (1450). This previously stored configuration data includes not only information about security sensors and zone configurations, but also network configuration information (e.g., information about the previously configured private network), monitoring and home automation devices, as well as widget programs and their configurations.

Once all configuration data has been downloaded and stored on the SMA controller, the SMA controller can be decoupled from the router (if a tethered connection was used for communication between the router and the SMA controller and will not be used for operational communications) (1460) and begin operations using the downloaded configuration data (1470). The router can automatically reconfigure itself to use the downloaded configuration data or may need to be restarted to use the downloaded configuration data. Once the SMA controller is operating using the downloaded configuration data, the person performing the install can be given the option of testing the device communication path (e.g., FIGS. 11 and 12) (1480). If the decision is to perform testing, then the activation/provisioning workflow can proceed to testing 650 (1490). If the decision is to not perform testing, then the activation/provisioning workflow can end.

The restoration installation workflow of FIG. 14 is one example of steps that can be conducted to enable restoration of configuration data. As discussed above, a provider may require different information from a person conducting the install in order to perform a restoration installation. For example, the provider can require a pass code in addition to the subscriber identification information. The provider may not require the phone number and time zone information for a restoration installation.

In another alternative embodiment, the SMA controller can be introduced to the home domain by resetting the router to factory defaults, rather than maintaining the previously configured settings. The SMA controller can then be coupled to the router using WiFi or tethered connection, as with the original installation detailed above. Once the configuration data has been provided to the SMA controller from the remote server, the SMA controller can use the data to automatically reconfigure the router to provision the secure network to the secured network's original configuration (i.e., corresponding to the network settings saved by the previous SMA controller in the home domain). In addition, the information needed for WiFi or other Ethernet-enabled monitoring devices to exchange data with the SMA controller is also provided when the router is reconfigured.

The result of a restoration installation is an install that bypasses the steps involved in an initial installation and results in an SMA controller that is provisioned in the same manner as a previous SMA controller, including network information, sensor and zone information, automation device information, monitoring device information, and widget program configuration.

With the exception of the restoration installation, the activation/provisioning workflow described above is designed to be performed entirely using SMA controller 120 without the use of any external computing resources or input device beyond a touch screen display associated with the SMA controller and any updates provided by a remote server. Displayed instructions and input screens are incorporated with the software (e.g., firmware) of the SMA controller such that a non-technical end-user or an installation technician without specialized training can perform an install of the SMA controller, along with the associated security sensors, camera monitoring devices, and network routing devices. In addition, since much of the network configuration is performed automatically by the SMA controller, the amount of typing of addresses and other information, and hence the opportunity for errors in such typing, is dramatically reduced. Since the installation process is performed using only a display coupled to the SMA controller, the need for additional equipment, such as a computer to perform the installation, is eliminated, and thereby the cost of performing installations is also reduced. Further, the streamlined process for performing the installation, coupled with the elimination of lengthy typing of addresses and the like, results in a faster installation process with less frustration than is found for typical systems. Thus, if a technician is performing such an installation, the cost for each installation is reduced due to the reduction in the need for installation technician time. Persons of ordinary skill in the art will understand that all of these factors provide advantages to systems embodying the present invention over traditional systems that require additional equipment to perform installations and specialized technician training, thereby increasing the costs for performing such installations.

An Example Computing and Network Environment

As shown above, the present invention can be implemented using a variety of computer systems and networks. An example of one such computing and network environment is described below with reference to FIGS. 15 and 16.

Figure 15:
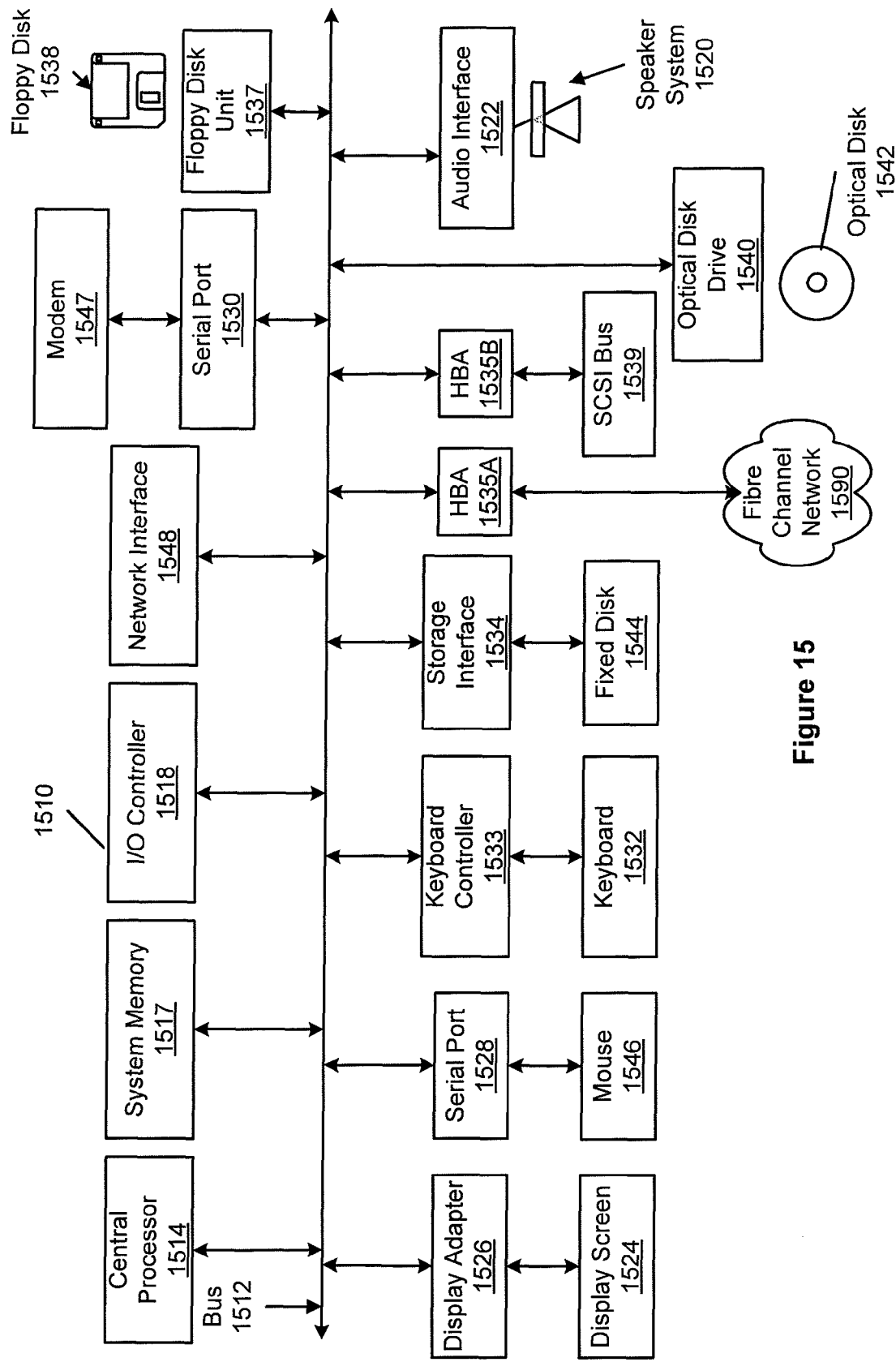
FIG. 15 illustrates a block diagram of a computer system suitable for implementing aspects of the present invention.

FIG. 15 depicts a block diagram of a computer system 1510 suitable for implementing aspects of the present invention (e.g., servers 165, portal server 170, backup server 175, telephony server 180, and database server 185). Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1510 are generally stored on and accessed via a computer-readable medium, such as a hard disk drive (e.g., fixed disk 1044), an optical drive (e.g., optical drive 1540), a floppy disk unit 1537, or other storage medium. Additionally, applications can be in the form of electronic signals modulated in accordance with the application and data communication technology when accessed via network modem 1547 or interface 1548.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 15 need not be present to practice the present invention. The devices and subsystems can be interconnected in different ways from that shown in FIG. 15. The operation of a computer system such as that shown in FIG. 15 is readily known in the art and is not discussed in detail in this application. Code to implement the present invention can be stored in computer-readable storage media such as one or more of system memory 1517, fixed disk 1544, optical disk 1542, or floppy disk 1538. The operating system provided on computer system 1510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
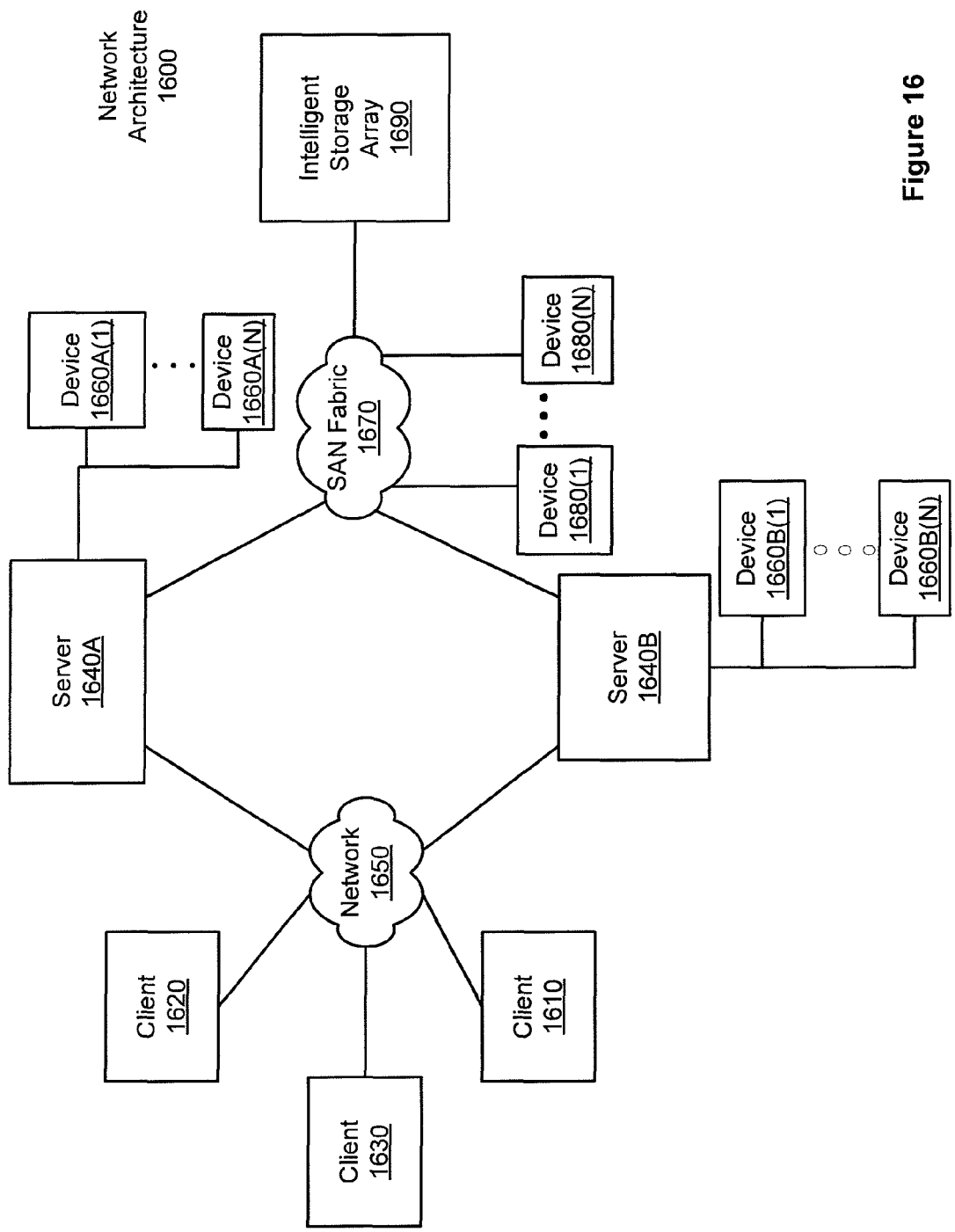
FIG. 16 illustrates a simplified block diagram of a network environment suitable for implementing aspects of the present invention.

FIG. 16 is a block diagram depicting a network architecture 1600 in which client systems 1610, 1620 and 1630, as well as storage servers 1640A and 1640B (any of which can be implemented using computer system 1610), are coupled to a network 1650. Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation of the invention. SAN fabric 1670 supports access to storage devices 1680(1)-(N) by storage servers 1640A and 1640B, and so by client systems 1610, 1620 and 1630 via network 1650. Intelligent storage array 1690 is also shown as an example of a specific storage device accessible via SAN fabric 1670.

With reference to computer system 1510, modem 1547, network interface 1548 or some other method can be used to provide connectivity from each of client computer systems 1610, 1620 and 1630 to network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method for configuring a first security, monitoring and automation (SMA) controller, the method comprising:
   determining whether the configuring of the first SMA controller is a first installation type or a second installation type;
   determining a networking option for use in configuring the first SMA controller when it is determined the configuring is the first installation type;
   transmitting a unique identifier to a first remote computer when it is determined that the configuring is the second installation type, wherein the transmitting is performed by the first SMA controller over a network connection between the first SMA controller and the first remote computer, the unique identifier is associated with configuration data previously stored by a second remote computer, and the configuration data is compatible with the first SMA controller, wherein the configuration data includes configuration data for one or more security sensors and security zones, wherein the configuration data comprises an association between each zone of the one or more security zones and a sensor of the one or more security sensors and an association of a response of the first SMA controller with the one or more security zones;

receiving the configuration data over the network connection by the first SMA controller;

storing the configuration data in a memory of the first SMA controller; and configuring the first SMA controller using the stored configuration data.

2. The method of claim 1, wherein the configuration data previously stored by the second remote computer comprises configuration data received by the second remote computer from a second SMA controller.

3. The method of claim 2, wherein the configuration data comprises configuration data received from the second SMA controller immediately subsequent to an initial configuration of the second SMA controller.

4. The method of claim 2, wherein the configuration data comprises configuration data received from the second SMA controller immediately subsequent to a modification of configuration data of the second SMA controller.

5. The method of claim 1, wherein the configuration data comprises one or more of configuration data for a home domain network, configuration data for a cellular network connection, configuration data for one or more monitoring devices, configuration data for one or more home area network devices each having an automation interface, configuration data and drivers for modules coupled to the first SMA controller, and widget programs and associated configuration data.

6. The method of claim 1, comprising requesting the unique identifier, wherein the requesting comprises displaying the request using a display device coupled to the first SMA controller.

7. The method of claim 1, further comprising testing a communication path between the first SMA controller and a third remote computer, wherein the testing the communication path is performed subsequent to the configuring the first SMA controller using the stored configuration data.

8. An apparatus that is a controller, the apparatus comprising:

a processor configured to determine whether configuring of the controller is a first installation type or a second installation type, and determine a networking option for use in configuring the controller when it is determined the configuring is the first installation type;

a communications interface coupled to the processor, coupled to a first remote computer using a network connection, and configured to transmit a unique identifier to the first remote computer when it is determined that the configuring is the second installation type, wherein the unique identifier is associated with configuration data previously stored by a second remote computer, and the configuration data is compatible with the apparatus, and configured to receive the configuration data, wherein the configuration data includes configuration data for one or more security sensors and security zones, wherein the configuration data comprises an association between each zone of the one or more security zones and a sensor of the one or more security sensors and an association of a response of the first SMA controller with the one or more security zones; and a memory coupled to the processor and storing the received configuration data; and wherein the processor configures the apparatus using the stored configuration data when the configuring is the second installation type.

9. The apparatus of claim 8, wherein the configuration data previously stored by the second remote computer comprises configuration data received by the second remote computer from a security, monitoring and automation (SMA) controller.

10. The apparatus of claim 9, wherein the configuration data comprises configuration data received from the SMA controller immediately subsequent to an initial configuration of the SMA controller.

11. The apparatus of claim 9, wherein the configuration data comprises configuration data received from the SMA controller immediately subsequent to a modification of configuration data of the SMA controller.

12. The apparatus of claim 8, wherein the configuration data comprises one or more of configuration data for a home domain network, configuration data for a cellular network connection, configuration data for one or more monitoring devices, configuration data for one or more home area network devices each having an automation interface, configuration data and drivers for modules coupled to the first SMA controller, and widget programs and associated configuration data.

13. The apparatus of claim 8, comprising:

a display device coupled to the processor; and the processor configured to display a request for the unique identifier using the display device.

14. The apparatus of claim 8, comprising the processor configured to test a communication path between the apparatus and a third remote computer, wherein the testing the communication path is performed subsequent to the configuring the apparatus using the stored configuration data.

\* \* \* \* \*